United States Patent
Gatchalian et al.

(10) Patent No.: US 10,958,583 B2
(45) Date of Patent: Mar. 23, 2021

(54) EDGE-NODE CONTROLLED RESOURCE DISTRIBUTION

(71) Applicant: Bank of America Corporation, Charlotte, NC (US)

(72) Inventors: Gilbert Gatchalian, Union, NJ (US); William August Stahlhut, The Colony, TX (US); Kamesh R. Gottumukkala, Concord, CA (US); Siten Sanghvi, Jersey City, NJ (US); Stephen T. Shannon, Charlotte, NC (US); Morgan S. Allen, Charlotte, NC (US); Christopher L. Rice, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 80 days.

(21) Appl. No.: 16/452,862

(22) Filed: Jun. 26, 2019

(65) Prior Publication Data

US 2020/0412654 A1  Dec. 31, 2020

(51) Int. Cl.
*H04L 12/851* (2013.01)
*H04L 12/927* (2013.01)
(Continued)

(52) U.S. Cl.
CPC ..... *H04L 47/2425* (2013.01); *G06Q 10/0631* (2013.01); *G06Q 10/105* (2013.01);
(Continued)

(58) Field of Classification Search
CPC ............. H04L 47/2425; H04L 47/2483; H04L 47/823; H04L 47/2475; H04L 47/805;
(Continued)

(56) References Cited

U.S. PATENT DOCUMENTS 8,126,764 B2 * 2/2012 Murray ................. H04W 68/00
705/7.29
8,243,596 B2  8/2012 Fedders et al.
(Continued)

OTHER PUBLICATIONS

Mary Shacklett, "Edge Computing: A Cheat Sheet," https://www.techrepublic.com/article/edge-computing-the-smart-persons-guide/, Jul. 21, 2017.
(Continued)

*Primary Examiner* — Jutai Kao
*Assistant Examiner* — Syed M Bokhari
(74) *Attorney, Agent, or Firm* — Weiss & Arons LLP; Michael A. Springs, Esq.

(57) ABSTRACT

This application describes apparatus and methods for using edge-computing to control resource distribution among access channels, such as a retail banking center. Edge-nodes may be configured to move a product display in response to detected or expected customer traffic flow in or near a retail location. Edge-nodes may be configured to redirect resources provided by a cloud computing environment to or away from the retail location. Based on customer traffic flow, edge-nodes may direct customers/resources to a retail location and ensure the retail location provides a predetermined quality of service.

13 Claims, 10 Drawing Sheets

(51) Int. Cl.
*H04L 12/911* (2013.01)
*G06Q 40/02* (2012.01)
*G06Q 30/02* (2012.01)
*G06Q 10/06* (2012.01)
*G06Q 10/10* (2012.01)
*H04L 12/859* (2013.01)

(52) U.S. Cl.
CPC ..... *G06Q 30/0255* (2013.01); *G06Q 30/0277* (2013.01); *G06Q 40/02* (2013.01); *H04L 47/2475* (2013.01); *H04L 47/2483* (2013.01); *H04L 47/805* (2013.01); *H04L 47/823* (2013.01)

(58) Field of Classification Search
CPC ........... G06Q 30/0277; G06Q 30/0255; G06Q 40/02; G06Q 10/0631; G06Q 10/105
USPC .......................................................... 370/235
See application file for complete search history.

(56) References Cited

U.S. PATENT DOCUMENTS

| | | | |
|---|---|---|---|
| 8,244,874 | B1 | 8/2012 | Thireault |
| 8,909,771 | B2 | 12/2014 | Heath |
| 9,900,725 | B2 | 2/2018 | Young et al. |
| 2014/0258062 | A1* | 9/2014 | Calman .............. G06Q 30/0201 705/35 |
| 2017/0064609 | A1* | 3/2017 | Park ................... G06Q 30/0261 |
| 2018/0121891 | A1 | 5/2018 | Hosny et al. |
| 2018/0167445 | A1 | 6/2018 | Speight et al. |
| 2018/0367314 | A1 | 12/2018 | Egner et al. |
| 2019/0026450 | A1 | 1/2019 | Egner et al. |
| 2019/0116128 | A1* | 4/2019 | Guo ...................... H04L 67/101 |
| 2019/0158606 | A1* | 5/2019 | Guim Bernat .......... H04W 4/40 |
| 2020/0195495 | A1* | 6/2020 | Parker .................. H04L 41/082 |

OTHER PUBLICATIONS

Paul Miller, "What is Edge Computing?" https://www.theverge.com/circuitbreaker/2018/5/7/17327584/edge-computing-cloud-google, May 7, 2018.

Preethi Kasireddy, "How Does Distributed Consensus Work?" https://medium.com/s/story/lets-take-a crack-at-understanding-distributed-consensus-dad23d0dc95, Nov. 13, 2018.

"What is Edge Comupting," https://www.ge.com/digital/blog/what-edge-computing, GE Digital, Retrieved on May 16, 2019.

Rafi Chowdhury, "5 Cloud-Based Services Every Entrepreneur Should Try," https://www.startupgrind.com/blog/5-cloud-based-services-every-entreprenuer-should-try/, Retrieved on May 22, 2019.

"Consensus (Computer Science)," https://en.wikipedia.org/wiki/Consensus_(computer_science), Wikimedia Foundation, Inc., May 28, 2019.

Ammer Rosic, "Basic Primer, Blockchain Consensus Protocol," https://blockgeeks.com/guides/blockchain-consensus/, Retrieved on May 29, 2019.

* cited by examiner

EDGE-NODE CONTROLLED RESOURCE DISTRIBUTION

FIELD OF TECHNOLOGY

This application describes apparatus and methods for distributing computing resources using edge-computing.

BACKGROUND

A merchant may operate multiple access channels to provide customers with goods and services (hereinafter, "products") offered by the merchant. A merchant may provide access to products via an online store. The merchant may provide access to products via a mobile application. The merchant may provide access to products via brick and mortar locations.

Each access channel utilized by the merchant may have its own set of resource requirements. For example, an online store may need to be hosted by a computer system that can provide uninterrupted access to customers that attempt to access the online store. A mobile application may need to be installed on a device that has sufficient computing resources to secure and process customer interactions with the application. A brick and mortar location may require human resources to adequately service customers.

Typically, the merchant may attempt to allocate resources to each access channel based on characteristics of the channel and customer demand associated with the channel. However, such an approach may cause inefficient use, and potential waste, of important resources. For example, a merchant may determine that during the day, a brick and mortar location should be staffed with five employees to meet peak customer demand. However, peak customer demand may only occur for an hour or two during the day. Thus, for most of the day, the merchant has over supplied resources to this access channel.

As a further example, a merchant may provide self-serve kiosks, such as automated teller machines ("ATMs"). The ATMs may be distributed within a geographic area. The ATMs may need to be stocked with cash to meet expected customer demand. However, the merchant may not know which ATM will be visited by a particular customer at any particular time. Each customer that resides within the geographic area may have equal access to each ATM. Thus, in an effort to provide maximum customer satisfaction, the merchant may attempt to maintain a threshold level of cash in all ATMs within the geographic area.

However, it may be costly to maintain the threshold level of cash in all the ATMs. Furthermore, despite the merchant's best efforts, on any particular day, a particular ATM may be frequented by an unexpected number of customers that exceeds expected demand. When expected demand is exceeded, some customers that visit the ATM may be informed that the ATM does not have sufficient cash on hand.

It would be desirable to reduce waste associated with underutilized resources. It would be desirable to improve the efficiency of resources deployed by the merchant. It would be desirable to improve utilization of resources deployed by the merchant and improve customer satisfaction and quality of service provided by the merchant across multiple access channels.

Accordingly it is desirable to provide apparatus and methods for edge-node controlled computing resource distribution.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
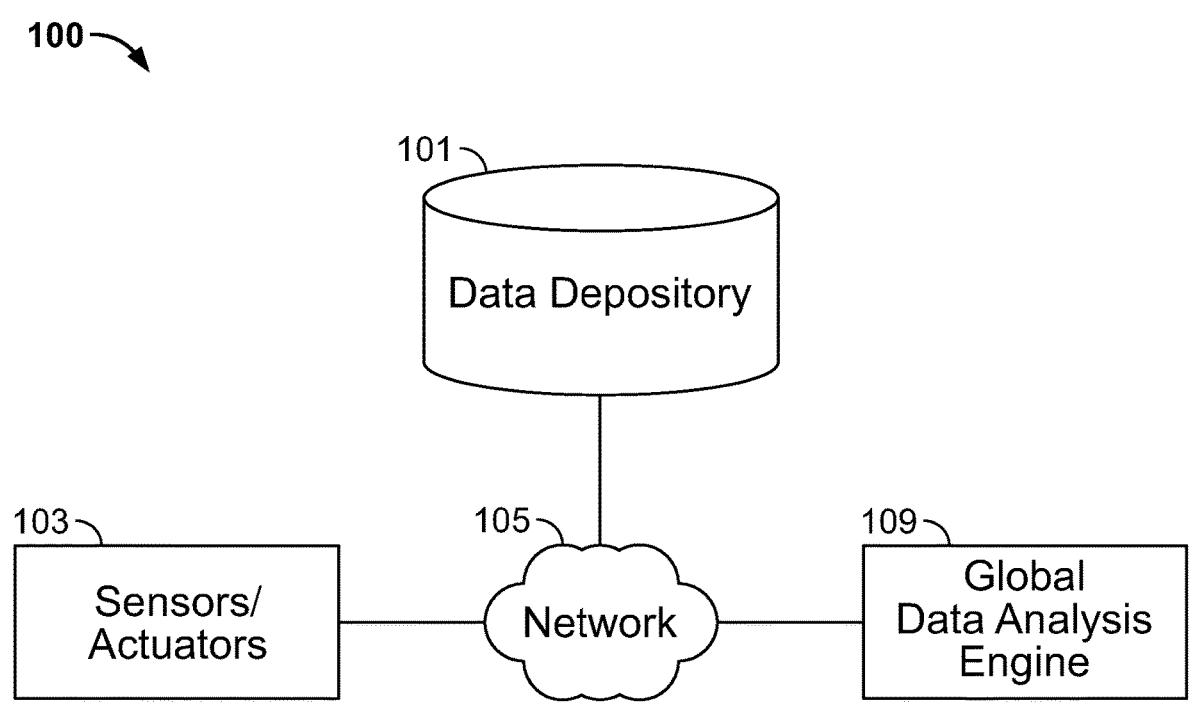
FIG. 1 shows an illustrative system in accordance with principles of the disclosure.

Apparatus and methods for edge-node controlled computing resource distribution are provided. An edge-node may be a node on the periphery or edge of a network. An illustrative network may be an internet-of-things ("IoT") network. An IoT network may include one or more nodes. Each node may include two or more nodes.

Network nodes may include sensors. A sensor may detect changes in attributes of a physical or virtual operating environment. For example sensors may measure attributes such as location, audio, rainfall, movement, temperature, water levels or activity of other sensors. Sensors may measure electronic network traffic, customer traffic, resource usage, electronic signals (e.g., input or output) or frequency of user logins within a predefined geographic area.

Nodes may be any suitable size. For example, nodes may be a few millimeters in size. Nodes may be deployed in a wide variety of locations. For example, sensors may be deployed in military battlefields, industrial plants, in orchards, in clothing, automobiles, smartphones, jewelry or refrigerators. Sensors may be relatively inexpensive and have low energy consumption. Sensors may "sense" two or more stimuli or environmental attributes.

Nodes may implement two or more functions. For example, sensors may measure changes in their operating (physical or virtual) environment, capture data corresponding to the measured changes and store/communicate the captured data. Sensors may be accessed by other sensors or other nodes on the network.

A node may be an actuator. For example, based on data captured by a sensor, an actuator may respond to a detected event. Based on the capture and analysis of multiple sources of data (e.g., captured by sensors), an actuator may be instructed to take action autonomously, without human intervention.

Actuators may respond to data transmitted or processed by other nodes. Actuators may include devices that modify the physical state of a physical entity. Actuators may include devices that modify a virtual state of information. Actuators may move (translate, rotate, etc.) physical objects or activate/deactivate functionalities of physical objects.

For example, actuators may dim a light bulb, open a door, change a temperature setting and/or any other suitable functionality. Actuators may push notifications or redistribute resources. For example, notifications may route resources consumers (e.g., customers) to a location that has available resources to service the consumption.

Within an IoT environment, sensor nodes may perform the functions of input devices—they serve as "eyes" collecting information about their native operating environment. In contrast, actuator nodes may act as "hands" implementing decisions based on data captured by the sensor nodes. A single node may include the functions of sensors and actuators.

Nodes may include an application programming interface ("API") for communicating with other nodes. Nodes may communicate directly with other nodes using machine-to-machine ("M2M") protocols. Illustrative M2M protocols may include MQ Telemetry Transport ("MQTT"). M2M includes communication between two or more objects without requiring direct human intervention. M2M communications may automate decision-making and communication processes for actuators.

Nodes may store captured data locally. For example, nodes may store captured data in on-board transitory and/or non-transitory computer readable media. A node may transmit data. Data captured by a node may be transmitted to another node. A node may transmit data to a network core.

The network core may process the data. For example, multiple sensors may transmit captured data to a cloud computing environment. The cloud computing environment may itself include multiple nodes, such as computer servers or other computer systems. Nodes of the cloud computing environment may be networked to each other.

The cloud computing environment may process data captured by other nodes far from the location where the data was generated. For example, captured data may be transmitted from one node to another node until the captured data reaches a centrally located data repository.

Data captured by nodes in an operating environment may be voluminous and complex (e.g., structured/unstructured and/or constantly changing). Traditional data processing application software may be inadequate to meaningfully process the voluminous and complex data (e.g., "big data"). A cloud computing environment may include software applications specially designed to process large volumes of data ("big data analytics").

Nodes may communicate with other nodes directly, without transmitting information to an intermediary node or central server, such as a cloud computing environment. Data may be transmitted by a node using any suitable transmission method. For example, data captured by a node may be transmitted from a smartphone via a cellular network. Nodes may leverage a communication link provided by a smartphone to communicate captured data to other nodes.

As a result of the disparate nature of nodes, a networked operating environment may support a variety of communication protocols. Illustrative supported protocols may include HyperText Transfer Protocol ("HTTP"), Simple Object Access Protocol ("SOAP"), REpresentational State Transfer ("REST") Constrained Application Protocol ("CoAP"), SensorML, Institute of Electrical and Electronic Engineers ("IEEE") 802.15.4 ("ZigBee") based protocols, IEEE 802.11 based protocols. For example, ZigBee is particularly useful for low-power transmission and requires approximately 20 to 60 milli-watts ("mW") of power to provide 1 mW transmission power over a range of 10 to 100 meters and a data transmission rate of 250 kilo-bits/second.

To further conserve energy, a node may communicate wirelessly for short periods of time. Utilizing this approach, one or more standard size single cell dry battery batteries (e.g., AA size) may provide a node with requisite computing power and wireless communication for many months.

A physical layer may link nodes within a network. The physical layer may provide data ports and communication pathways to move data between multiple sub-networks and nodes. Such communication pathways may be wired or wireless. Exemplary wireless communication pathways may include Ethernet, Bluetooth, Wi-Fi, 3G, 4G, 5G and any other suitable wired or wireless broadband standards. Illustrative data ports of nodes may include hardware and/or software for receiving and/or transmitting data using any suitable communication pathway.

Each node may be assigned a unique identifier. For example, nodes may be identified by one or more radio frequency identification ("RFID") tags. The RFID tag may be stimulated to transmit identity information about the node or any other information stored on the RFID tag. Nodes may be identified by an Internet Protocol ("IP") address. Nodes may be identified based on a user. For example, a smartphone may be a node identified based on a user that successfully inputs biometric credentials.

Nodes may be positioned in, and capture data from, diverse operating environments. Operating environments may include geographic locations or virtual locations on electronic networks. Captured data may be transmitted to a location where information is needed for decisioning or consumption. Such a location may not be the same location where the data was captured or generated. Data synchronization protocols and caching techniques may be deployed across a network to facilitate transmission of data, or delivery of data to, any desired node.

For example, a location where data is captured may not have continuous, reliable network connectivity. Accordingly, captured data may be stored locally on a node until a network connection is available to transmit or broadcast the captured data to another node.

Nodes may be grouped. Nodes may be grouped based on physical proximity or based on the content (or expected content) of data captured by the sensor. Nodes may be grouped based on detected movement of a node. For example, nodes may be affixed to vehicles or other moveable objects. Nodes may move in or out of a network. Nodes within a geographic area may be grouped based on their presence within the geographic area. Nodes may be grouped based on their expected trajectory. Nodes may be grouped based on whether they are resource consumer or providers. Nodes may be grouped based on expected resource consumption. Nodes may be grouped virtually. Grouped nodes may form a sub-network.

Nodes may be grouped based on "closeness." "Closeness" may be defined based on geographic proximity. "Closeness" may be defined based on a length of a communication pathway (physical or virtual) that connects a node and an edge-node. "Closeness" may be defined based on a length of a communication pathway (physical or virtual) that connects a node and an edge-node.

A length of a communication pathway may be defined based on a number of intermediary nodes between a node and an edge-node. A length of a communication pathway may be defined based on distance physically separating a node from an edge-node.

Contextually, data captured by nodes may provide information not only about the native (physical or virtual) operating environment surrounding a node, but data captured by multiple nodes may provide data that signifies occurrence an event. The data may be analyzed by a cloud computing environment. Analytical tools (e.g., big data analysis techniques) may detect, within the data, occurrence of an event that triggers actuator nodes to take responsive action.

Advances in embedded systems, such as System-on-a-Chip ("SoC") architectures, have fueled development of nodes that are powerful enough themselves to run operating systems and complex data analysis algorithms. An illustrative SoC may include a central processing unit ("CPU"), a graphics processor ("GPU"), memory, power management circuits, and communication circuit. Within an operating environment, such nodes may be positioned closer (relative to the cloud computing environment) to other data gathering nodes such as sensors. Nodes positioned close to the source of generated data and having sufficient computational power to process the data may be termed "edge-nodes." Edge-nodes may integrate sensing capabilities, actuating capabilities, data connectivity and/or computing capacities.

Edge-nodes may control sensors, actuators, embedded devices and other nodes. Edge-nodes, or the nodes they control, may not be continuously connected to a network. Edge-nodes may provide computational resources positioned near the source of captured data or near an operating environment. Processing data using edge-nodes may reduce the communication bandwidth needed to transmit data from a node to a cloud computing environment.

For example, a sensor deployed in a windfarm turbine may detect changes in wind speed or wind direction. Typically, the sensor may transmit detected changes to a remote cloud computing environment. The remote cloud computing environment may process data received from the sensor (and other nodes) and issue instructions to adjust a position of the turbine in response to the detected changes. However, communication with, and processing by, the cloud computing environment may inject additional latency before the turbines are adjusted in response to the sensed changes.

By running data analytics and processing closer to the originating source of data, actuator response times may be improved. Edge-nodes embedded in the turbine may include sufficient processing power to analyze sensed data and adjust turbines with less latency (perhaps even in close to real-time) and thereby optimize electricity production of the turbine.

In addition to providing faster response time to sensed changes, processing data using edge-nodes may reduce communication bandwidth requirements and improve overall data transfer time across a network. Furthermore, less frequent data transmissions may enhance security of data gathered by nodes. Frequent data transfers may expose more data to more potential security threats. For example, transmitted data may be vulnerable to being intercepted en-route to the cloud computing environment.

Additionally, edge-nodes may be tasked with decision-making capabilities. Edge-nodes may discard non-essential data generated by sensors. Such disregarded data may never be transmitted or stored in the cloud computing environment, further reducing network bandwidth consumption and exposure of such data to security threats.

For example, a network of security cameras (e.g., sensor nodes) may generate large amounts of video data. Transmitting such large amounts of video data to a cloud computing environment may utilize significant bandwidth—possibly preventing the cloud computing environment from timely receiving other data. Edge-nodes may analyze the video data at the source, before transmitting the video data to the cloud computing environment. The analysis by the edge-nodes may identify "important" video data and discard the rest. Only the important video data may be transmitted to the cloud computing environment, reducing network congestion.

For some applications, necessary reliability and critical-path control management make it undesirable to wait for the cloud computing environment to process data and issue responsive instructions. Often instructions to actuators need to be issued in milliseconds or faster. Round-trip communication to a cloud computing environment introduces undesirable latency.

For example, an anti-collision algorithm for an autonomous vehicle may be executed by the cloud computing environment. However, it would be faster and more reliable for such anti-collision algorithms to be run by edge-nodes. Furthermore, the anti-collision data may have short-term value and it would therefore be undesirable to regularly transmit that data to the cloud computing environment.

Some nodes may be deployed in areas with poor network connectivity. For example, industries such as mining, oil/gas, chemicals and shipping may not be well served by robust affordable communication infrastructure. Incorporating edge-nodes may allow networks associated with these industries to process data without robust communication infrastructure.

Utilizing edge-nodes to process data may improve security of a network. For example, a network breach may be detected by an edge-node. The intrusion may be quarantined by or at the edge-node and thereby prevent the breach from compromising the entire network.

Edge-nodes may run encryption algorithms and store biometric information locally. Such dispersion of security protocols may reduce risk of security information being comprised. Utilizing edge-nodes may disperse processing power needed to run the security or encryption algorithms.

Utilizing edge-nodes may improve reliability of a network. For example, edge-nodes with machine learning capabilities may detect operational degradation in nodes, equipment, and infrastructure deployed within an operating environment. Early detected degradation may be cured before developing into full-blown failures.

Generally, edge-nodes may include a processor circuit. The processor circuit may control overall operation of an edge-node and its associated components. A processor circuit may include hardware, such as one or more integrated circuits that form a chipset. The hardware may include digital or analog logic circuitry configured to perform any suitable (e.g., logical) computing operation.

A edge-node may include one or more of the following components: I/O circuitry, which may include a transmitter device and a receiver device and may interface with fiber optic cable, coaxial cable, telephone lines, wireless devices, physical layer hardware, a keypad/display control device or any other suitable encoded media or devices; peripheral devices, which may include counter timers, real-time timers, power-on reset generators or any other suitable peripheral devices; a logical processing device, which may compute data structural information, structural parameters of the data, quantify indices; and machine-readable memory.

Machine-readable memory may be configured to store, in machine-readable data structures: captured data, computer executable instructions, electronic signatures of biometric features or any other suitable information or data structures. Components of a node may be linked by a system bus, wirelessly or by other suitable interconnections. Edge-node components may be present on one or more circuit boards. In some embodiments, the components may be integrated into a single chip, such as a SoC. The chip may be silicon-based.

The node may include RAM, ROM, an input/output ("I/O") module and a non-transitory or non-volatile memory. The I/O module may include a microphone, button and/or touch screen which may accept user-provided input. The I/O module may include one or more of a speaker for providing audio output and a video display for providing textual, audiovisual and/or graphical output.

Software applications may be stored within the non-transitory memory and/or other storage medium. Software applications may provide instructions to the processor that enable an edge-node to perform various functions. For example, the non-transitory memory may store software applications used by an edge-node, such as an operating system, application programs, and an associated database. Alternatively, some or all of computer executable instructions of an edge-node may be embodied in hardware or firmware components of the edge-node.

Software application programs, which may be used by an edge-node, may include computer executable instructions for invoking user functionality related to communication, such as email, short message service ("SMS"), and voice input and speech recognition applications. Software application programs may utilize one or more algorithms that request alerts, process received executable instructions, perform power management routines or other suitable tasks.

An edge-node may support establishing network connections to one or more remote nodes. Such remote nodes may be edge-nodes, sensors, actuators or other computing devices. Edge-nodes may be personal computers or servers. An edge-node may communicate with other nodes using a data port. The data port may include a network interface or adapter. The communication circuit may include the modem. The data port may include a communication circuit. An edge-node may include a modem, antenna or other communication circuitry for establishing communications over a network, such as the Internet. The communication circuit may include the network interface or adapter.

Via the data port and associated communication circuitry, an edge-node may access network connections and communication pathways external to the edge-node. Illustrative network connections may include a local area network ("LAN") and a wide area network ("WAN"), and may also include other networks. Illustrative communication pathways may include Wi-Fi, wired connections, Bluetooth, cellular networks, satellite links, radio waves, fiber optic or any other suitable medium for carrying signals.

The existence of any of various well-known protocols such as TCP/IP, Ethernet, FTP, HTTP and the like is presumed, and a node can be operated in a client-server configuration to permit a user to retrieve web pages from a web-based server. Web browsers can be used to display and manipulate data on web pages.

Edge-nodes may include various other components, such as a display, battery, speaker, and antennas. Edge-nodes may be portable devices such as a laptop, tablet, smartphone, other "smart" devices (e.g., watches, eyeglasses, clothing having embedded electronic circuitry) or any other suitable device for receiving, storing, transmitting and/or displaying electronic information.

An edge-node may include a display constructed using organic light emitting diode ("OLED") technology. OLED technology may enhance functionality of an edge-node. OLEDs are typically solid-state semiconductors constructed from a thin film of organic material. OLEDs emit light when electricity is applied across the thin film of organic material. Because OLEDs are constructed using organic materials, OLEDs may be safely disposed without excessive harm to the environment.

Furthermore, OLEDs may be used to construct a display that consumes less power compared to other display technologies. For example, in a Liquid Crystal Display, power must be supplied to the entire backlight, even to illuminate one pixel in the display. In contrast, an OLED display does not necessarily include a backlight. Furthermore, in an OLED display, preferably, only the illuminated pixel draws power.

The power efficiency of OLED technology presents a possibility for designing edge-nodes that consume less power for their basic functionality and allow any residual available power to provide enhanced security and functionality. Illustrative devices that may be constructed using OLED technology are disclosed in commonly assigned U.S. Pat. No. 9,665,818, which is hereby incorporated by reference herein in its entirety.

An edge-node may be, and may be operational with, numerous other general purpose or special purpose computing system environments or configurations. Examples of well-known computing systems, environments, and/or configurations that may be suitable for use with this disclosure include, but are not limited to, personal computers, server computers, handheld or laptop devices, tablets, "smart" devices (e.g., watches, eyeglasses, clothing having embedded electronic circuitry) mobile phones and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like.

Edge-nodes may utilize computer-executable instructions, such as program modules, executed by a processor. Software applications may include multiple program modules. Generally, program modules include routines, programs, objects, components, data structures, etc. that perform particular tasks or implement particular abstract data types. An edge-node may be operational with distributed computing environments where tasks are performed by remote processing devices that are linked through a communications network. In a distributed computing environment, program modules may be located in both local and remote computer storage media including memory storage devices. Edge-nodes may interact with a network of remote servers hosted on the Internet to store, manage, and process data (e.g., a cloud computing environment).

Edge-nodes may include a battery. The battery may be a power source for electronic components of the edge-node. For example, the battery may supply power to the display, the communication circuit and the processor circuit. In some embodiments, an edge-node may include a plurality of batteries. Edge-nodes may include solar panels that convert solar energy into electricity that power one or more components of an edge-node.

An edge-node may receive data in real-time or at predefined intervals, such as once a day. The edge-node may filter data captured by one or more nodes. The edge-node may repackage or reformat captured data. Data conversion may include transformation of low level raw data (possibly from multiple sensors or groups of sensors) into meaningful information for a specific audience or for a specific analysis.

For example, captured data intended for human consumption or interaction may be converted into a human understandable format. Captured data intended for machine consumption may be converted into a format readable by a particular machine or node.

An edge-node may perform pattern recognition to identify correlations and trends in captured data. The correlations and trends may indicate expected or current resource consumption. The edge-nodes may redistribute resources based on expected or current resource usage. The edge-nodes may route resources consumers (e.g., customers) to a location that has available resources to service the consumption.

The edge-node may evaluate a cost of resource consumption or costs of redistributing resources and/or consumers. "Costs" may be monetary (e.g., labor costs or infrastructure costs), time-related or related to a level of intrusion needed to obtain desired data.

"Costs" may be bandwidth-related. For example, a communication pathway may be associated with a fixed bandwidth. A communication pathway may include nodes and network connectivity linking those nodes. The bandwidth may limit an amount of information or a rate of transmission over the communication pathway. As further example, a node may respond slowly to a request from another node if there is a large amount of informational traffic traveling on a communication pathway shared with other nodes. The large amount of informational traffic may not leave sufficient bandwidth for the transmitting node to timely communicate with the requesting node.

As a further example, a node may respond slowly if the node transmits a large amount of captured data. If transmitted all at once, the large amount of information transmitted by the node, together with other informational traffic traveling on a shared communication pathway, may be close to, or exceed bandwidth resources of the communication pathway. As a result, the network may become congested and other nodes on the network may be unable to transmit time-sensitive captured data in a timely manner.

Data travelling within a network to/from nodes may be routed along multiple communication pathways until the transmitted information reaches a desired destination node (e.g., a cloud computing environment). Each communication pathway may service a number of connected nodes and a respective volume of informational traffic.

It may be difficult to ascertain available bandwidth resources on a particular communication pathway. It may be difficult to ascertain which communication pathways are being utilized to transmit information between nodes. Nodes attempting to transmit information over a communication pathway may not be aware of a number of connected nodes, a volume of traffic on a particular communication pathway or a bandwidth capacity of a communication pathway.

Furthermore, a communication pathway may be controlled by a different entity from an entity responsible for operation of a particular node. The entity responsible for operation of the node may be unable to monitor a number of nodes that share a communication pathway, a bandwidth capacity of a communication pathway or a volume of traffic transmitted on a communication pathway. Edge-node may be configured to manage data transmission of other nodes and associated bandwidth usage and reduce network congestion.

Apparatus may include an edge-node computing system. The system may provide data-driven assessment of products available within a merchant location. The system may provide data-driven assessment of product positioning within the merchant location. The system may include sensors positioned on and around the product or product location. The sensors may capture a detail-rich set of data of customer activity surrounding a product, such as the foot/online traffic the product attracts, a ratio of customers who pick up/view the product, a ratio of customers who actually purchase the product.

The edge-nodes may be configured to process the captured customer activity data. The customer activity data can be processed by edge-nodes and analyzed to provide an assessment of the product as well as the product environment, and resources needed to maintain a quality of service provided to customers. Based on the captured data, the edge-nodes may be configured to change a position of the product within a merchant location. A merchant location may include any suitable access channel, such as online or brick and mortar.

Sensors may monitor customer traffic flow. Based on detected traffic flow, edge-nodes may re-route the flow of customers and/or available resources to service the customer traffic flow. Illustrative sensors for monitoring customer traffic flow may include cameras, location sensors, gyroscopes, pedometers, pressure sensors, signal triangulation, network usage, customer or node movement. For example, sensors may monitor usage of customer devices, payment instruments and transactions. An online banking application may provide access to sensors and a communication channel of a customer's smartphone.

The system may monitor customer traffic for patterns connoting interest in specific products. Such monitoring may allow the edge-nodes to provide precise and efficient traffic and resource routing to service detected interest in those products. For example, a customer may flag, using an online banking application, a product needed or of interest. The system may direct the customer, via the application or other features of a smartphone, to a location that has resources available to provide the product to the customer.

The system may be configured to provide different resources to different locations. For example, resources may be routed based on detected customer status. A customer status may dictate that customer is provided a higher level of quality of service than typically offered via an access channel. The system may be configured to flag such customers and allocate resources to the access channel to provide the higher level of quality of service.

Based on detecting customer traffic flows, the system may route or redirect resources. For example, the system may route computing resources, such as bandwidth, to high-traffic locations. The system may utilize edge-node computing to calculate the resources available (e.g., cash or other ATM functionality) within a network of ATM's. Based on detected customer traffic-flow or expected traffic flow patterns, the system may route customers to the nearest ATM that has resources needed by the customer.

Edge-node computing may also trigger replenishment of resources (e.g., cash supply or maintenance crews) to provide a threshold level of quality of service. For example, sensors embedded in an ATM may detect when the ATM is low on cash. In response to detecting low cash level, edge-nodes may redirect a customer to another nearby ATM with sufficient cash supply to meet a typical need of the customer.

An edge-node computing system is provided. The system may include a moveable product display. The moveable product display may be located at a first position within a merchant location. The location may be a brick and mortar retail location. An illustrative brick and mortar location may include a banking center operated by a financial institution. A banking center may include ATMs or other self-service kiosks.

The system may include a first edge-node. The first edge-node may be configured to sense customer traffic in a banking center. For example, the first edge-node may sense a volume of customers that enter or exit the banking center. The first edge-node may include a motion sensor. A motion sensor may be positioned at or near an entrance to the banking center. The first edge-node may include pressure sensors. One or more pressure sensors may be embedded in a floor of the banking center. The pressure sensors may detect customer movement across the floor. The first-edge node may include a heat sensor. Heat sensors may detect customer contact. The first edge-node may include two or more sensors.

The system may include a second edge-node. The second edge-node may be configured to sense a volume of customer traffic attracted by the moveable product display. For example, the second edge-node may include a motion sensor that is configured to detect when a customer pauses (for a threshold amount of time) in front of the moveable product display. The second edge-node may include a pressure sensor that is configured to detect when a customer pauses (for a threshold amount of time) in front of the moveable product display. The second edge-node may include a camera that is configured to detect when a customer pauses (for a threshold amount of time) in front of the moveable product display. The second edge-node may be moveable. The second edge-node may be configured to move and position itself relative to a position of the moveable display.

The system may include a third edge-node. The third edge-node may be embedded in the moveable product display. The third edge-node may be configured to sense customer engagement with the product display. For example, the moveable display may include two or more embedded sensors. The embedded sensors may detect when a customer reads information presented on the display.

For example, the embedded sensor may detect when a customer is looking at the moveable display. Such sensors may detect a body position of the customer. Such sensors may detect eye movement of the customer. The embedded sensors may detect when a customer touches the moveable display. For example, the moveable display may include a touch sensitive screen. The touch sensitive screen may detect when a customer contacts the screen or "swipes" to read displayed information.

The embedded sensors may detect when a customer takes removable promotional material available within the moveable display. For example, the promotional material may include a passive radio-frequency identification ("RFID") tag. The embedded sensor may include a RFID reader that detects movement of the passive RFID tag. The RFID reader may detect when a customer moves the promotional material.

Each of the three sensing edge-nodes may be configured to execute a consensus protocol. The consensus protocol may be a software application. The consensus protocol may be executed by one edge-node. The consensus protocol may be executed by two or more node. The data captured by each of the three edge-nodes may be inputs to the consensus protocol.

Illustrative consensus protocols may include a proof of work protocol, a proof of stake protocol, a delegated proof of stake protocol, a transaction as proof of stake protocol and a delegated byzantine fault tolerance protocol. Any suitable consensus protocol may be utilized.

An output of the consensus protocol may be a default level of interest in the moveable product display. The consensus protocol may ensure all the edge-nodes agree on a default level of interest. The consensus protocol may gauge the default level of interest based on a first position of the moveable product display within the banking center. The consensus protocol may execute based on collective data sensed by each the three edge-nodes.

The consensus protocol may determine a second position of the product display within the banking center. The consensus protocol may determine that when the moveable display is in the second position, a greater number of customers may be attracted to, or engage with, the moveable display.

The consensus protocol may issue instructions to the moveable product display. The consensus protocol may issue the instructions to actuator nodes. The instructions may cause the moveable product display to move from the first position to the second position. The actuators may move the moveable display.

The banking center may include a network of rails or tracks. The rails or tracks may be mounted on a ceiling of the banking center. The rails or tracks may be mounted in a floor of the banking center. The moveable product display may include wheels, treads or any other suitable mechanism for moving the moveable display. The moveable display may include motors for rotating the wheels. Rotating the wheels may move the moveable display along the tracks/rails. The moveable display may move along a floor of the banking center without tracks or rails.

The actuators of the moveable product display may operate according to a Computer Numerical Control ("CNC") protocol. A CNC protocol may include standard CNC protocols known to those skilled in the art. An edge-node may control movement of the moveable display.

The moveable product display may include collision avoidance sensors. When the moveable product display is moving from the first position to the second position, the collision avoidance sensors may prevent the moveable display from contacting furniture or other obstacles in the banking center. In some embodiments, when the moveable product display is stationary, the collision avoidance sensors may gather data on customer attraction or engagement with the moveable product display. An edge-node may run collision avoidance software that controls movement of the moveable display based on data gathered by the collision avoidance sensors.

Each edge-node may be configured to transmit sensed data to a cloud computing environment. The cloud computing environment may be remote from the banking center. Based on the sensed data collectively sensed by the edge-nodes, the cloud computing environment may be configured to determine a target location within the banking center for the moveable product display. The cloud computing environment may generate instructions that move the moveable product display to the target location.

The cloud computing environment may determine the target location based on data associated with multiple moveable displays in multiple banking centers. The cloud computing environment may determine the target location based on data associated with customer engagement with multiple moveable displays in multiple banking centers. The cloud computing environment may determine that when the moveable display is in the target location, relative to the first or second position, a greater number of customers may be attracted to the information presented in the moveable display.

The target location determined by the cloud computing environment may not correspond to the second position determined by the consensus protocol. To resolve such position conflicts, the system may determine whether the difference in positon is greater than a threshold distance. When the difference in position differs by less than the threshold distance, the system may not register a position conflict.

Before registering a position conflict, the system may determine whether each of the determined positions is available for the moveable display, for a given layout of a banking center. For example, the target position may be unavailable because other equipment is already positioned in the target position. In some embodiments, the system may determine whether the other equipment may be moved.

When there is a position conflict, the system may be configured to give priority to the position that is expected to yield more customer engagement with the moveable product display. Resolution of a position conflict may rely on machine learning algorithms to determine the most effective position for the moveable display. The machine learning algorithms may determine a most effective position for a moveable display based on sensor data associated with a given banking center. The machine learning algorithms may determine a most effective position for a moveable display based on sensor data collected from multiple banking centers. The data from multiple banking centers may be stored and analyzed by the cloud computing environment.

Machine learning algorithms may determine the effectiveness of a position for the moveable display. For example, a machine learning algorithm may learn based on sensor data gathered by edge-nodes within the banking center. The sensor data gathered by the edge-nodes may determine a level of engagement and/or interest of customers with the moveable display.

The machine learning algorithm may correlate the sensor data gathered by the edge-nodes with transactional activity that occurred in the banking center. The machine learning algorithm may further correlate transactional activity that occurred in the banking center and positions of the moveable display with transactional activity that occurs after customers leave the banking center. Transaction activity that occurs after customers leave the banking center may include purchases, withdrawals, transfers or any other suitable transactions.

Based on the correlations, the machine learning algorithm may determine whether customers that engaged with the moveable product display utilize products/services presented by the moveable display. A feedback loop may allow the machine learning algorithm to learn which products/ services presented by the moveable display are most utilized by customers that frequent the banking center. A feedback loop may allow the machine learning algorithm to learn which products/services presented by the moveable display for a given position of the moveable display within the banking center.

The machine learning algorithm may determine a location of the moveable display and associated products to be presented by the moveable display that generate a threshold demand for a product. The machine learning algorithm may issue instructions to the moveable display on which product to present, at which time and which position, within the banking center.

The machine learning algorithm may direct resources to the banking center based on expected demand for products presented by the moveable product display. In some embodiments, the machine learning algorithm may move the moveable display to a position that is calculated to generate less than a maximum or threshold demand for products presented by the moveable product display.

The machine learning algorithm may move the moveable display to a position within the banking center that is calculated to trigger a demand for the presented products that can be serviced by resources available to the banking center. The machine learning algorithm may position the moveable display so that resources available to the banking center service provide a threshold quality of service to customers.

The banking center may be one of a plurality of banking centers. The cloud computing environment may be configured to determine a target location for the moveable display based on sensed data received from edge-nodes within a plurality of banking centers. Products presented by the moveable display may be determined based on the collective data sensed by the edge-nodes in the banking center. Products presented by the moveable display may be determined based sensed data received from edge-nodes within a plurality of banking centers. Collective data may indicate interest in particular products or suitable positions for informing customers of a particular product.

The location of the moveable product display within a banking center may be configured to change based on a time of day. The volume of customer traffic flow within the banking center may vary throughout the day. The products/ services provided by the banking center and desired by customers may change at different times during a day. In accordance with those needs, the moveable product display may be configured to adjust its position and/or products presented.

For example, during times the banking center is expected to be relatively busy, the moveable display may transition to a position where customers gather while waiting for available services. During other times of day, when the volume of customers entering the banking center is lower, the moveable display may be moved closer to an entrance of the banking center so that all customers entering the banking center are exposed to the moveable display.

In some embodiments, the moveable display may be completely hidden from view. Hiding the moveable display may provide more space for customers to move about the banking center. Hiding the moveable display may reduce resources need by the banking center.

In other embodiments, the moveable display may present public service information. Public service information may include a weather or traffic advisory or notice of an upcoming public holiday and associated availability of the banking center. In other embodiments, the moveable display may be configured to provide entertainment programming to customers expected to be waiting for service.

The system may be configured to move the moveable display in anticipation of future customer traffic patterns in the banking center. The system may also be configured to detect unexpected customer traffic patterns in the banking center. The system may move the moveable display in response to real-time customer traffic patterns detected in the banking center.

For example, the location of the moveable product display may be configured to change based on transactions executed by customers in the banking center during a predetermined time period. The transactions may indicate customers would benefit from another related service or product. The moveable display may be configured to display information and associated materials about the related service or products. The moveable display may be positioned within the banking center to inform the customers of the related services and/or products.

In some embodiments, the moveable display may adjust a position or information presented based on a transaction activity of a single customer. For example, the moveable display may be positioned at or near an exit of the banking center. In response to a service or product provided to a customer, the moveable display may present information associated with a related product or service as the customer exits the banking center.

An edge-node computing system is provided. The system may include a cloud computing environment. The cloud computing environment may distribute computing resources among a plurality of banking centers. The system may include a first plurality of edge-nodes. The first plurality of edge-nodes may be configured to sense and determine a customer traffic flow in a target banking center. The customer traffic flow may include a number of customers currently in the banking center.

Edge-nodes may include motion sensors, temperature sensors, pressure sensors, capacitive touch sensors, pedometer sensors, gyroscope sensors, accelerometer sensors and/or location sensor. The first plurality of edge-nodes may include sufficient computing power and resources to sense and analyze sensed data needed to determine a customer flow in the banking center.

The system may include a second plurality of edge-nodes. The second plurality of edge-nodes may be configured to sense customer flow within a predetermined distance of a banking center. The predetermined distance may be a distance from the banking center or any other suitable landmark. Illustrative distances may include inch, feet, meters, miles or any other suitable distance. The second plurality of edge-nodes may be deployed within a predetermined distance of the banking center. The second plurality of edge-nodes may determine a number of customers expected to enter the banking center within a predetermined time interval.

The second plurality of edge-nodes may include merchant point-of-sale terminals and associated systems. The second plurality of edge-nodes may include an online banking application running on a mobile device. The second plurality of edge-nodes may include credit or debit payment instruments.

Data captured by the second plurality of edge-nodes may be indicative of whether a customer is expected to visit a target banking center. For example, the data gathered by the second plurality of edge-nodes may indicate that a customer may follow a particular pattern before visiting a banking center. The pattern may be a series of transactions such as purchases. The pattern may be a travel pattern. The pattern may be a home-work commute.

The first and second plurality of edge-nodes may collectively execute a consensus protocol. The consensus protocol may determine an expected level of interest in a target banking center. The expected level of interest may be based on data sensed and captured by each of the first and second plurality of edge-nodes. The expected level of interest may be based on an analysis of the sensed and captured data. The analysis may be performed by individual edge-node for data sensed/captured by that edge-node. The analysis may be performed by another edge-node within a predetermined distance of an edge-node that sensed/gathered data.

The consensus protocol executed by the edge-nodes may determine a level of resources needed to provide a predetermined quality level of service for the level of interest. Resources may include computing resources. Illustrative computing resources may include communication bandwidth, processor time, dedicated server time, database access, applications, memory or any other computing resources typically provided to the target banking center by a cloud computing environment.

Resources may include available cash in a network of ATMs. For example, the consensus protocol may locate the ATMs most likely to be accessed by a given customer at a given time, and determine whether the ATMs that have sufficient cash available. Edge-nodes may be embedded in an ATM. The edge-nodes embedded in the ATM may detect when the ATM is low on cash. The embedded edge-nodes may be configured to trigger cash replenishment for the ATM when the ATM is low on cash.

The level of computing resources needed may be determined by the edge-nodes without transmitting the data to the cloud computing environment. The level of computing resources needed may be determined by the edge-nodes without analysis, by the cloud computing environment, of data sensed/captured by the edge-nodes.

Based on the level of computing resources needed to provide the predetermined level of service, the edge-nodes may collectively route a flow of computing resources from the cloud computing environment to the target banking center. The flow of computing resources may provide the target banking center with access to computing resources needed to provide a predetermined quality level of service.

The cloud computing environment may route the computing resources to the target banking center by diverting computing resources from another banking center. The cloud computing environment may route the computing resources to the target banking center by accessing unused and available computing resources. The cloud computing environment may incur costs to obtain the computing resources to provide the predetermined quality level of service.

The target banking center may be a first target banking center. To maintain the predetermined quality level of service at the first target banking center, the consensus protocol may be configured to utilize edge-nodes and redirect customer traffic detected within the predetermined distance to a second target banking center.

A second target banking center may have access to sufficient resources to service the redirected customers. Before redirecting customer traffic to the second target banking center, the consensus protocol may be configured to determine that the second target banking center is configured to provide a predetermined quality level of service for the redirected customers.

For example, the second target banking center may have available human resources. The second target banking center may be an ATM with sufficient cash to service a typical withdrawal request of a redirected customer. The consensus protocol may redirect customer traffic by pushing a notification to an edge-node such as a mobile device. The consensus protocol may redirect the customer traffic by calling the mobile device and relaying an audio message redirecting the customer.

Based on maintaining a predetermined quality level of service, the consensus protocol may be configured to redirect resources from a second target banking center to the first target banking center. Any suitable resources may be redirected. Illustrative resources may include computing, cash and/or human resources.

For example, the consensus protocol may trigger a transfer of cash from a second target banking center to a first target banking center. To maintain the predetermined quality level of service, the consensus protocol may redirect human resources from a second target banking center to the first target banking center. The consensus protocol may trigger a transfer of resources before an anticipated arrival of expected customer traffic at the first target banking center.

Methods for distributing computing resources among a plurality of banking centers are provided. Methods may include positioning a moveable product display at a first location within a banking center. Using a first group of edge-nodes, methods may determine a volume of customer traffic in the banking center. Using a first group of edge-nodes, methods may determine a volume of customer traffic in the banking center over a predetermined time period. A predetermined time period may be seconds, minute(s), hour(s), day(s), week(s), month(s), year(s) or any suitable time period. An edge-node may include sufficient computing resources to determine the volume of customer traffic based on sensed data without accessing a remote cloud computing environment.

Methods may include using a second group of edge-nodes to determine a volume of customer traffic within a predetermined distance of the banking center. The predetermined distance may be a distance from the banking center or any other suitable landmark. Illustrative distances may include inch, feet, meters, miles or any other suitable distance. Methods may include determining the customer traffic within the predetermined distance at any given time. Methods may include determining the customer traffic within the predetermined distance over a duration of time.

The second group of edge-nodes may include edge-nodes positioned in a banking center. The second group of edge-nodes may include edge-nodes that are configured to sense data indicative of a level of interest, by customer traffic within the banking center, in a moveable display. The sensed data may include customers that pass within a predetermined distance of the moveable display, customers that pause in front of the moveable display, customers that read information presented by the moveable display, customers that touch the moveable display, customers that take promotional material presented by the moveable display. Such data may be sensed by heat sensors, pressure sensor, motion sensors, RFID tags or any other suitable sensors.

Each edge-node in the second group may be configured to analyze its sensed data. Each edge-node in the second group may be configured to determine a level of interest based on its sensed data. Methods may include executing a consensus protocol among members of the first and second groups of edge-nodes. The consensus protocol may determine a level of interest in the moveable product display that has been agreed upon by a group of edge-nodes.

Illustrative consensus protocols may include a proof of work protocol, a proof of stake protocol, a delegated proof of stake protocol, a transaction as proof of stake protocol and a delegated byzantine fault tolerance protocol. Any suitable consensus protocol may be utilized.

Methods may determine a level of computing resources needed to provide a predetermined quality level of service for the determined level of interest. Based on the level of interest, methods may include determining a target location for the moveable product display within the banking center. Providing the predetermined quality level of service may require resources. Illustrative resources may include computing resources, equipment and/or human resources. Based on the predetermined quality level of service, the consensus protocol may be configured to direct resources to or from the banking center.

A target location may be configured to generate more or less customer interest in the moveable product display. For example, the consensus protocol may determine that a current position of the moveable display is generating more interest than can be adequately serviced by resources available to the banking center. The consensus protocol may transfer resources to the banking center to meet the increased interest. The consensus protocol may move the moveable display to a location is expected to lower the level of interest and conserve resources available to the banking center.

The consensus protocol may be configured to issue instructions to move the moveable display to a target location within the banking center. Methods may include formulating and transferring the instructions to actuator nodes that move the moveable display. Methods may include moving the moveable product display to the target location.

The target location may be configured to increase the level of interest in the moveable display. The target location may be configured to decrease the level of interest in the moveable display. Decreasing the level of interest may allow resources currently available to the banking center to provide a predetermined quality level of service.

Methods may include routing resources to the banking center so that the banking center can provide the predetermined quality level of service. The banking center may be a first banking center. Routing of resources may include configuring a cloud computing environment to divert computing resources from a second banking center to the first banking center. Illustrative routing computing resources to a banking center may include adjusting bandwidth of network connections linking the banking center to the cloud computing environment. Illustrative routing computing resources to a banking center may include adjusting processor time allocated by the cloud computing environment to the banking center.

A third group of edge-nodes may be embedded in the moveable product display. Methods may include sensing customer engagement with the moveable product display. Methods may include executing the consensus protocol among members of the first, second and third groups of edge-nodes.

The moveable product display may provide access to a mix of products. Based on the level of interest, methods may include changing the mix of products.

Methods may include routing human resources to the banking center. Based on the consensus protocol, human resources may be provided to the banking center such that the banking center is configured to provide the predetermined quality level of service. Routing of human resources may include automated scheduling of the human resources. The automated scheduling may instruct employees, such as bank tellers, which banking center they should report to.

The consensus protocol may route employees to different banking centers at different times of day. The consensus protocol may route employees to different banking centers based on maintaining the predetermined quality level of service at a banking center. Edge-nodes may be configured to provide employees with routing instructions. For example, routing instructions may be displayed on an employee's mobile device or at the employee's work station.

Apparatus and methods described herein are illustrative. Apparatus and methods in accordance with this disclosure will now be described in connection with the figures, which form a part hereof. The figures show illustrative features of apparatus and method steps in accordance with the principles of this disclosure. It is to be understood that other embodiments may be utilized and that structural, functional and procedural modifications may be made without departing from the scope and spirit of the present disclosure.

The steps of methods may be performed in an order other than the order shown and/or described herein. Method embodiments may omit steps shown and/or described in connection with illustrative methods. Method embodiments may include steps that are neither shown nor described in connection with illustrative methods. Illustrative method steps may be combined. For example, an illustrative method may include steps shown in connection with another illustrative method.

Apparatus may omit features shown and/or described in connection with illustrative apparatus. Apparatus embodiments may include features that are neither shown nor described in connection with illustrative apparatus. Features of illustrative apparatus may be combined. For example, an illustrative apparatus embodiment may include features shown or described in connection with another illustrative apparatus/method embodiment.

FIG. 1 shows illustrative system architecture 100. Architecture 100 may represent an illustrative network. Architecture 100 may include one or more nodes. Each node may include two or more nodes. Nodes may be linked to each via network 105. FIG. 1 shows exemplary nodes 103 that include sensors and actuators. Nodes 103 may communicate with data analysis engine 109 and data depository 101. Data analysis engine 109 and data depository 101 may be included in a cloud computing environment. Data analysis engine 109 and data depository 101 may be illustrative computing resources provided by a cloud computing environment.

Sensors may include devices that detect changes in a physical or virtual environment. Sensors may measure changes in their native (physical or virtual) environment, capture data corresponding to the measured changes and store/communicate the captured data. Sensors may be accessed by other sensors or other network nodes. Sensors may transmit captured data to another node.

Actuators may respond to data transmitted or processed by other nodes, such as data analysis engine 109. Actuators may include devices that modify the physical state of a physical entity. Actuators may include devices that modify a virtual state of information. Actuators may move (translate, rotate, etc.) physical objects or activate/deactivate functionalities of physical objects. A single node may include the functions of sensors and actuators.

Generally, nodes on a network may interact and cooperate using one or more interaction paradigms. Exemplary interaction paradigms include principal-agent, client-server and peer-to-peer interactions. As a result of the disparate nature of nodes 103, system architectures, such as architecture 100 incorporating nodes 103 may support a variety of communication protocols.

Nodes 103 may be produced by different manufacturers. Nodes 103 may capture data in different formats. For example, nodes 103 may use different data structures to store captured data. Nodes 103 may utilize different communication protocols to transmit captured data or communicate with other nodes. Despite such operational differences, nodes 103 may be configured to operate substantially seamlessly together.

Nodes 103 may belong to, or be operated by, different administrative/management domains. Nodes 103 may be operated by different domains without expressly-defined relationships among such domains. Interoperability of nodes 103 may allow captured data to be substantially seamlessly captured and interpreted by data analysis engine 109 (or other nodes). Based on interpreting the captured data, data analysis engine 109 may issue instructions to nodes 103.

Data gathering by one or more of nodes 103 may be controlled by one or more other nodes. For example, data analysis engine 109 may control a quantity and/or quantity of data captured by nodes 103. Alternatively, data depository 101 and/or analysis engine 109 may filter or otherwise intelligently process data captured by nodes 103. One of nodes 103 may control data gathering or actuation of another of nodes 103.

Timing of when data is captured by nodes 103 may be controlled by any suitable node of architecture 100. For example, data may be captured in real-time or at pre-defined intervals such as once a second, once a minute, once every hour, once a day or any other suitable interval. Data may also be captured in response to a detected status change in an operating environment.

Data analysis engine 109 may filter data captured by nodes 103. Data analysis engine 109 may repackage or reformat captured data. Data conversion may include transformation of low level raw data (possibly from multiple sensors or groups of sensors) into meaningful information for a specific audience or for a specific analysis. Data analysis engine 109 may perform pattern recognition to identify correlations and trends in captured data.

Data depository 101 may receive data captured by nodes 103. In some embodiments, data captured by nodes 103 may be transmitted directly to data analysis engine 109. Data stored in depository 101 may be sorted and analyzed by data analysis engine 109. Data stored in data depository 101 may be so voluminous and complex (e.g., structured/unstructured and/or constantly changing) that traditional data processing application software may be inadequate to meaningfully process the data (e.g., "big data"). Data analysis engine 109 may include software applications specially designed to process large volumes of data ("big data analytics"). Based on captured data, data analysis engine 109 may reallocate resources to nodes 103 and identify new analytical models that may utilize data captured by nodes 103.

Architecture 100 may include one or more layers of software applications. Software applications may implement a variety of functions and provide varied services to nodes of architecture 100. Software applications running on data analysis engine 109 may submit requests to nodes 103 for retrieval of specific data to achieve a functional goal. Software applications may control data captured by nodes 103 or actions taken by nodes 103. Software applications may control an allocation of computing resources within architecture 100. Software applications may provide security services that mitigate threats to the integrity of data transmitted by sensors 103 or architecture 100 generally.

Nodes 103 that are positioned relatively close to a source of data and having sufficient computational power to process data may be termed "edge-nodes." Edge-nodes may integrate sensing capabilities, actuating capabilities, data connectivity and/or computing capacities. Edge-nodes may control sensors, actuators, embedded devices and other nodes. Edge-nodes, or the nodes they control, may not be continuously connected to a network. Edge-nodes may provide increased computational resources positioned near the source of captured data. Processing data using edge-nodes may reduce communication bandwidth needed to transmit data from a node to a cloud computing environment for processing.

Nodes 103 may be grouped. Nodes may be grouped based on physical proximity or based on proximity to an edge-node. An edge-node may create and/or be included in a node group. In some embodiments, captured data may be organized by an edge-node. An edge-node may manage and coordinate inter-node communications for members of a group.

Figure 2:
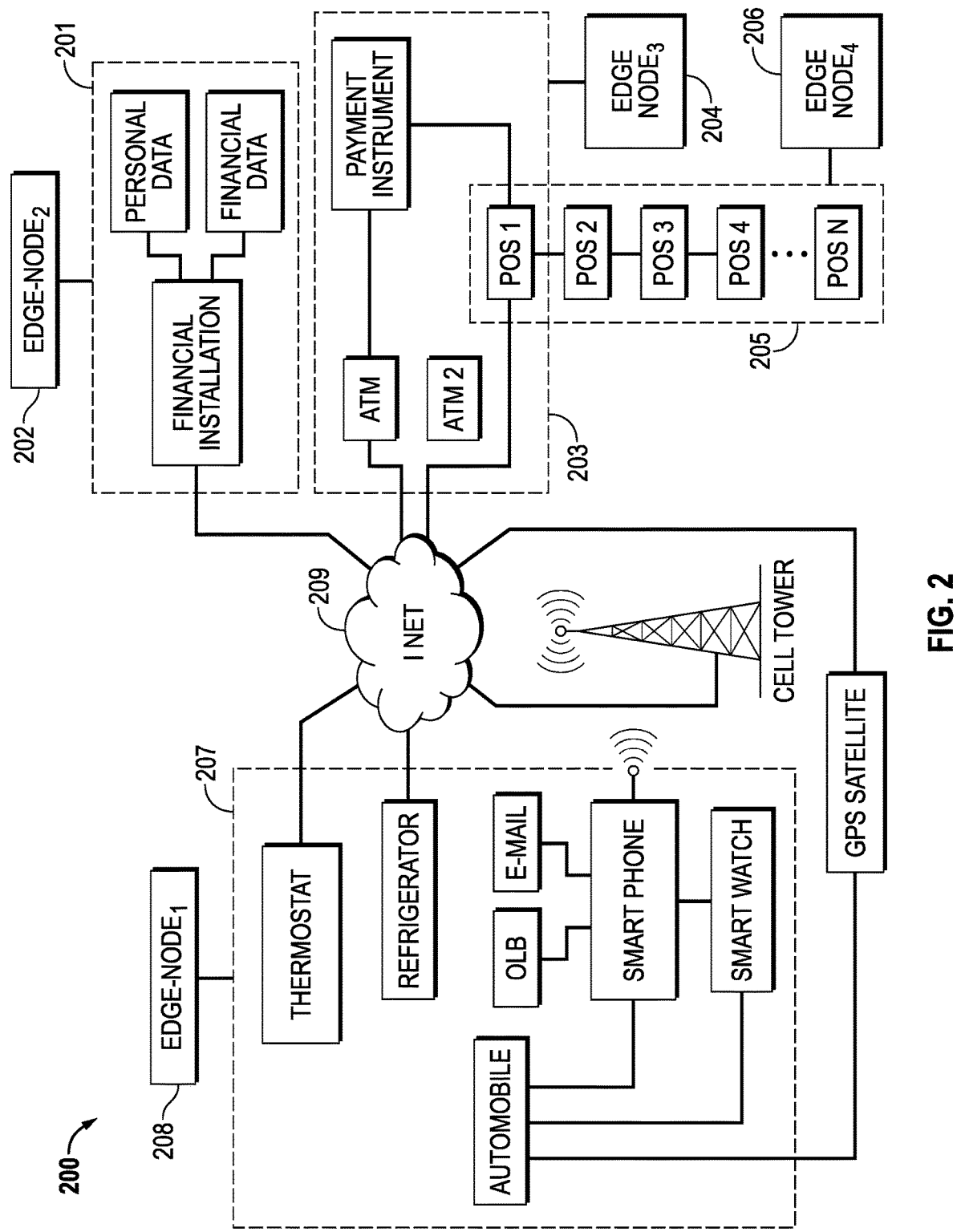
FIG. 2 shows an illustrative system in accordance with principles of the disclosure.

FIG. 2 shows illustrative node groups 200. Edge-node 208 is associated with group 207. Edge-node 208 may facilitate seamless communication among nodes of group 207. Edge-node 208 may facilitate secure communication among nodes of group 207. Edge-node 208 may process data gathered by nodes in group 207. Edge-node 208 may monitor resources needed by nodes in group 207. Edge-node 208 may allocate or reallocate resources to nodes in group 207.

Edge-node 202 is associated with group 201. Edge-node 202 may facilitate seamless communication among nodes of group 201. Edge-node 202 may facilitate secure communication among nodes of group 201. Edge-node 202 may process data gathered by nodes in group 201. Edge-node 202 may monitor resources needed by nodes in group 201. Edge-node 202 may allocate or reallocate resources to nodes in group 201.

Edge-node 204 is associated with group 203. Edge-node 204 may facilitate seamless communication among nodes of group 203. Edge-node 204 may facilitate secure communication among nodes of group 203. Edge-node 204 may process data gathered by nodes in group 203. Edge-node 204 may monitor resources needed by nodes in group 203. Edge-node 204 may allocate or reallocate resources to nodes in group 203.

Edge-node 206 is associated with group 205. Edge-node 206 may facilitate seamless communication among nodes of group 205. Edge-node 206 may facilitate secure communication among nodes of group 205. Edge-node 206 may process data gathered by nodes in group 205. Edge-node 206 may monitor resources needed by nodes in group 205. Edge-node 206 may allocate or reallocate resources to nodes in group 205.

Data gathered by nodes in one group may be used by nodes in another group. For example, data gathered by nodes in group 207 may be used by nodes in groups 207, 205 or 201. Data gathered by nodes in group 207 may indicate a trajectory of a customer or a current position of a customer. Such data may be used by sensors in groups 201, 203 or 205 to determine resources needed to service customers. Based on the trajectory or current position, edge-nodes 208, 204, 206 and/or 202 may reallocate resources to nodes in their respective groups.

FIG. 2 shows nodes groups communicating via central network 209. Edge-nodes may facilitate direct communication between one or more nodes of its group and one or more nodes of another group.

Figure 3:
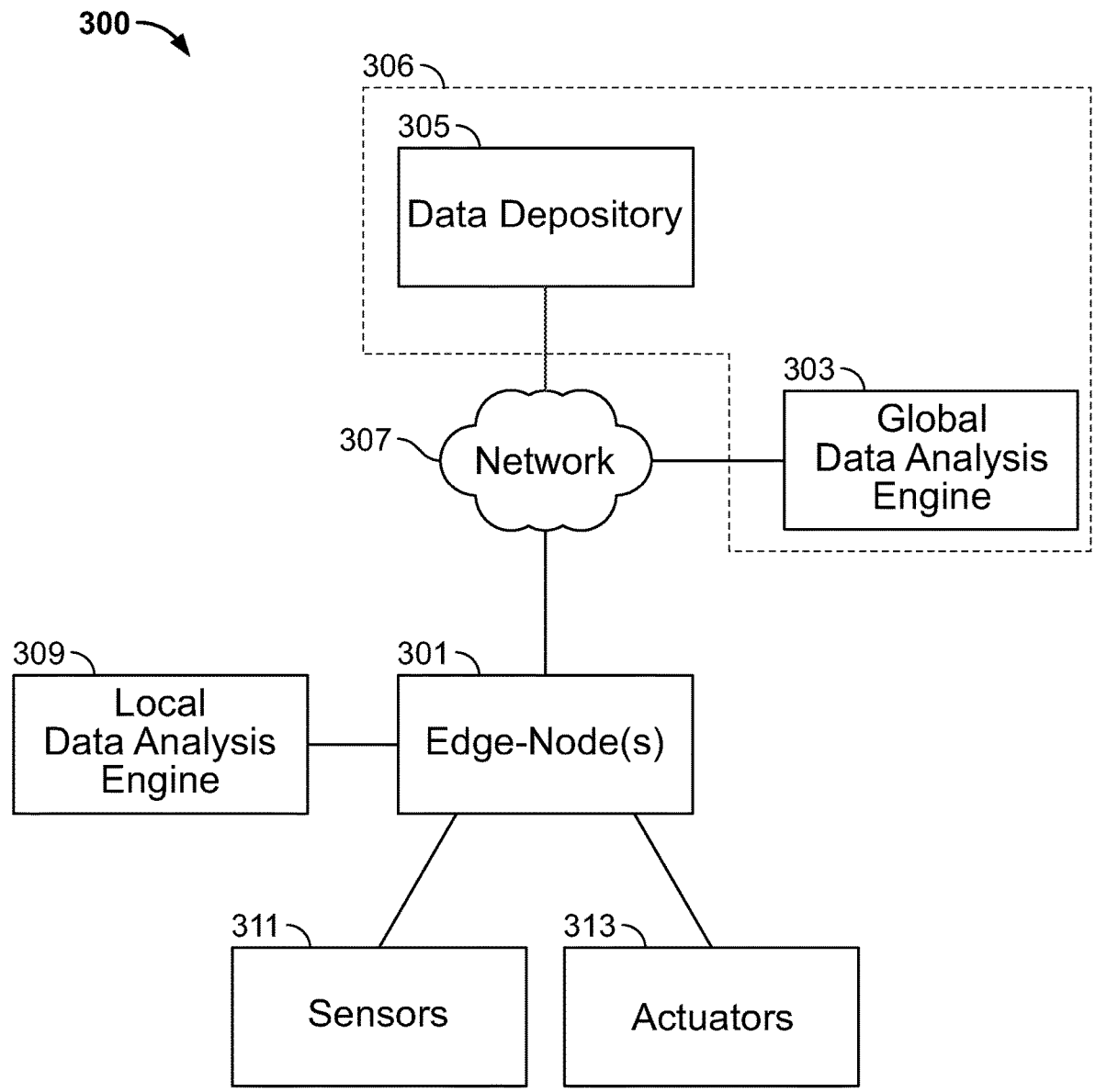
FIG. 3 shows an illustrative system in accordance with principles of the disclosure.

FIG. 3 shows illustrative system architecture 300. System 300 includes data depository 305 and global data analysis engine 303. Data depository 305 and global data analysis engine 303 may be resources provided by cloud computing environment 306. Data depository 305 may store data gathered by sensors 311 and actuators 313. Global data analysis engine 303 may be configured to determine, based on the gathered data, resources that need to be allocated to a banking center. Global data analysis engine 303 may be configured to determine, based on the gathered data, a target position for a moveable product display in a banking center.

System 300 includes edge-node(s) 301. Edge-node(s) 301 may be positioned in a banking center. Edges-node(s) 301 may be configured to receive data from sensors 311 and issue instructions to actuators 313. Edge-node(s) 301 may be configured to detect customer traffic flow within or near the banking center. Customer traffic flow may include customers interested in a product display. Sensors 311 may gauge customer interest based on customers who pick up promotional material presented by a product display. Sensors 311 may detect customers who purchase a product presented in a display. Sensors 311 may detect customers who engage (e.g., contact a touchscreen) with the moveable display.

Based on data gathered by sensors 311, edge-node(s) 301 may process the data gathered using local data analysis engine 309. Edge-node(s) 301 may issue instructions to actuators 313. The instructions may move a moveable product display to a target position within a banking center. The instructions may redirect customer traffic. The instructions may direct/redirect computing resources. The instructions may redirect computing resources provided by cloud computing environment 306 via network 307.

Figure 4:
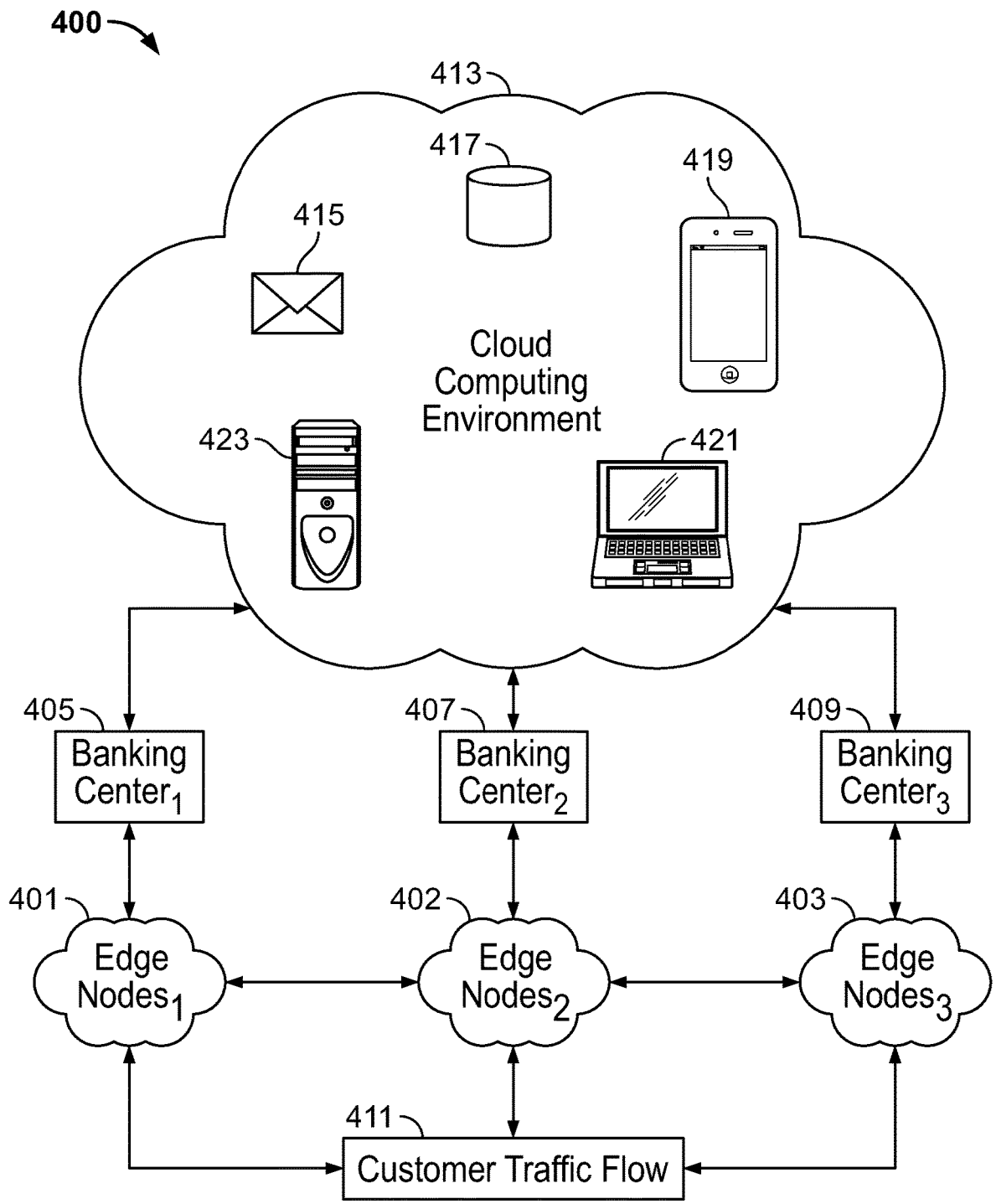
FIG. 4 shows operation of an illustrative system in accordance with principles of the disclosure.

FIG. 4 shows illustrative system 400. System 400 includes cloud computing environment 413. Cloud computing environment 413 provides various computing resources to banking centers 405, 407 and 409. FIG. 4 shows that cloud computing environment 413 provides illustrative computing resources such as email services 415, applications 419, data connectivity 421, processing power 423 and database 417.

System 400 includes edge-nodes 401, 402 and 403. FIG. 4 shows that edge-nodes 401, 402 and 403 may monitor and process customer traffic flow 411. Customer traffic flow 411 may include customer traffic in a banking center. Customer traffic flow may include customer traffic attracted by a product display. Customer traffic flow may include customer traffic within a predetermined distance of a banking center.

Processing customer traffic flow may include gauging a level of customer interest in a product display. Processing customer traffic flow may include determining, based on the level of interest, a target position for the product display. Processing customer traffic flow may include determining a level of computing resources needed to provide a predetermined quality level of service for the level of interest or sensed customer traffic flow. Processing customer traffic flow may include routing computing resources from cloud computing environment 413 to a target banking center. Processing customer traffic flow may include redirecting customer traffic. Processing customer traffic flow may include routing computing resources of cloud computing environment 413 from a first banking center (e.g., 405) to a second banking center (e.g., 409).

Figure 5:
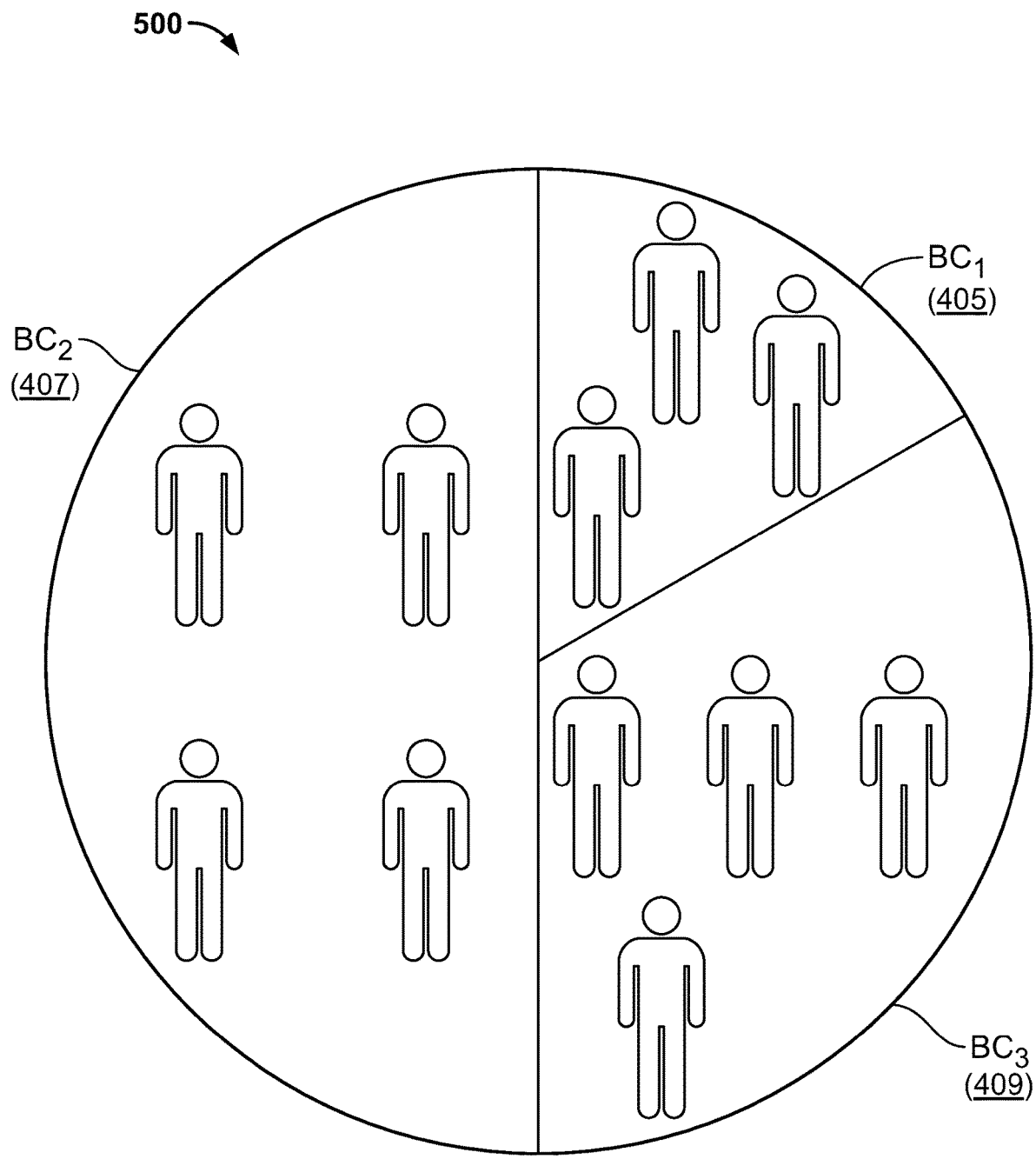
FIG. 5 shows an illustrative distribution of resources in accordance with principles of the disclosure.

FIG. 5 shows illustrative customer traffic flow 500. Customer traffic flow 500 includes customer traffic associated with banking center $BC_1$ (shown as 405 in FIG. 4). Customer traffic flow 500 includes customer traffic associated with banking center $BC_2$ (shown as 407 in FIG. 4). Customer traffic flow 500 includes customer traffic associated with banking center $BC_3$ (shown as 409 in FIG. 4).

Customer traffic associated with a banking center may include customer traffic within a banking center. Customer traffic associated with a banking center may include customer traffic within a predetermined distance of a banking center. Customer traffic associated with a banking center may include customer traffic that demonstrates an interest in a product display. FIG. 5 shows that banking centers 407 and 409 are associated with the same volume of customer traffic. FIG. 5 show that banking center 405 is associated with comparatively less customer traffic than banking centers 407 and 409.

FIG. 5 also shows resources available to a banking center. In FIG. 5, resources available to a banking center are represented by slices of a pie chart. Thus, FIG. 5 shows that banking center 407 currently has more available resources than banking centers 409 or 405. FIG. 5 also shows that banking center 409 has more available resources than banking center 405, and fewer available resources than banking center 407. FIG. 5 shows that banking center 407 may have excess resources for the customer traffic currently associated with banking center 407. FIG. 5 shows that banking center 405 may have insufficient resources for the customer traffic currently associated with banking center 405.

Figure 6:
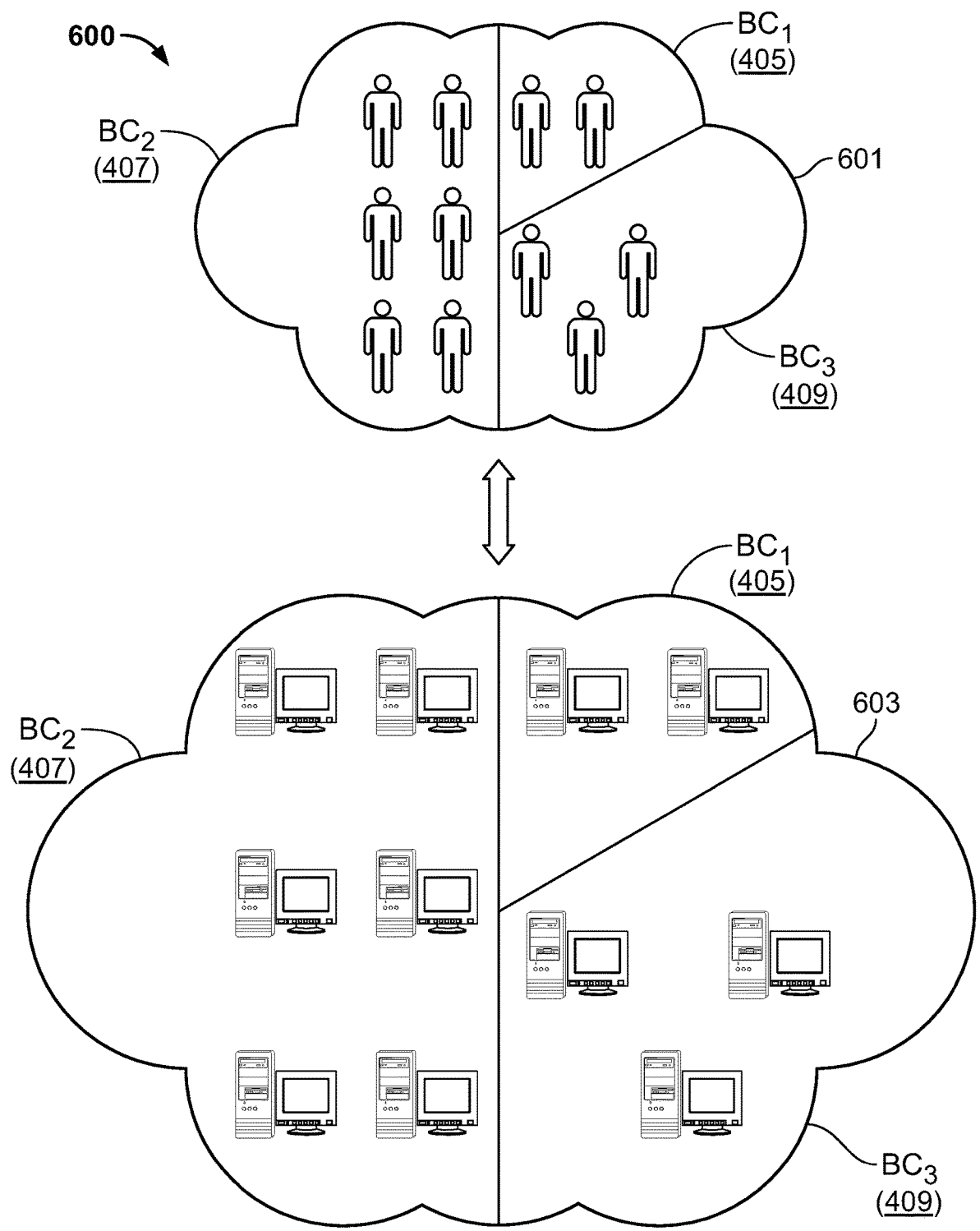
FIG. 6 shows illustrative re-distribution of resources shown in FIG. 5 in accordance with principles of the disclosure.

FIG. 6 shows illustrative resource and customer distributions 600. Distribution 601 shows that customer traffic has been redirected (relative to FIG. 5) among banking centers 405, 407 and 409. Distribution 601 shows that customer traffic has been redirected (relative to FIG. 5) from banking centers 405 and 409 to banking center 407. Edge-nodes (such as edge-nodes 401, 402 and 403 shown in FIG. 4) may be configured to redirect customer traffic to provide a predetermined quality level of service at each of the banking centers.

FIG. 6 also shows resource distribution 603. Resource distribution 603 shows that banking center 407 has more computing resources than banking centers 405 or 409. The additional computing resources may be redirected from cloud computing environment 413 to banking center 407 by edge-node 402. Resources provided to banking center 407 may ensure that banking center 407 provides a predetermined quality level of service for customer traffic flow 601.

Resource distribution 603 also shows that banking centers 405 and 409 now have sufficient resources to provide predetermined quality level of service for customer traffic flow 601 associated with those banking centers. Redirecting customer traffic away from banking centers 405 and 409 may provide these banking centers sufficient resources. Customer traffic may be redirected by one or more of edge-nodes 401, 402 and 403.

Figure 7:
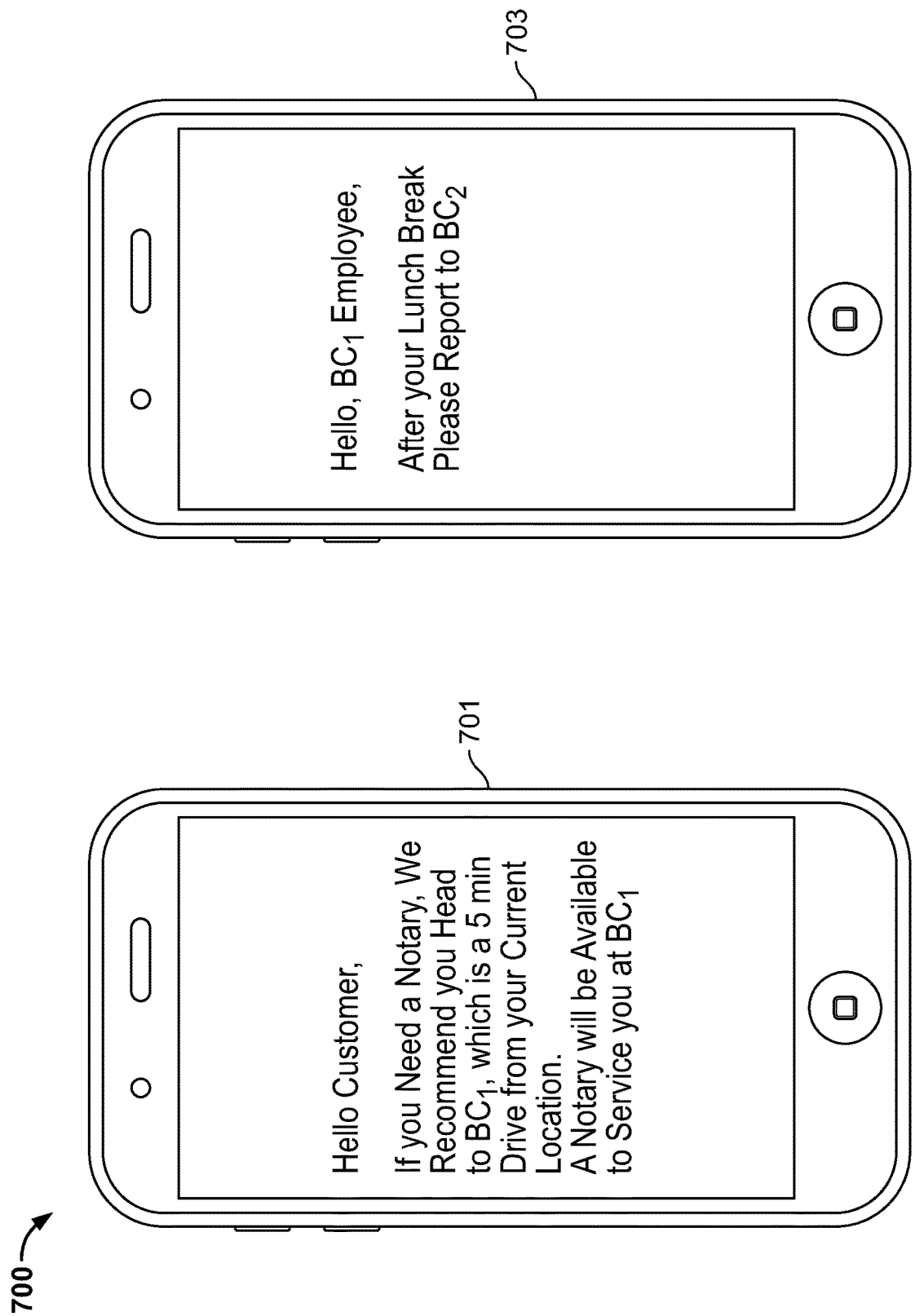
FIG. 7 shows an illustrative method of re-distributing resources in accordance with principles of the disclosure.

FIG. 7 shows illustrative methods 700 for redirecting customer traffic or resources. Methods 700 include an edge-node (such as edge-nodes 401, 402 and 403 shown in FIG. 4) pushing notification 701 to a customer mobile device. Notification 701 may be pushed to a customer mobile device. The customer device may be within a predetermined distance of a target banking center. An edge-node may determine that the customer is en-route to the target banking center and may desire a specific service provided by the target banking center.

An edge-node may determine a location of the customer based on one or more sensors embedded in the customer's mobile device. The edge-node may determine that the customer is en-route to the target banking center based on a detected trajectory of the customer. The trajectory may be detected based on sensors embedded in the mobile device. Illustrative sensors may include a pedometer sensor, an accelerometer sensor, or a location sensor. In some embodiments, the edge-node may be the mobile device of the customer.

The edge-node may determine a specific product desired by the customer based on historical services utilized by the customer. The edge-node may determine the specific product desired by the customer based on transactional activity that occurred prior to detecting that the customer is heading toward the target banking center. The edge-node may determine the specific product desired by the customer based on request for the product submitted by the customer.

Notification 701 shows that the edge-node informs the customer that a desired product is available at a nearby banking center. Notification 701 informs the customer that resources are available at the nearby banking center to provide a predetermined quality level of service.

Methods 700 include an edge-node pushing notification 703 to an employee device. Notification 703 may be pushed to the employee device when an edge-node determines that resources need to be redirected from one banking center to another. Notification 703 shows that an employee is being redirected from a first banking center to a second banking center. The edge-node may determine that second banking will need additional resources to service expected customer traffic.

Figure 8:
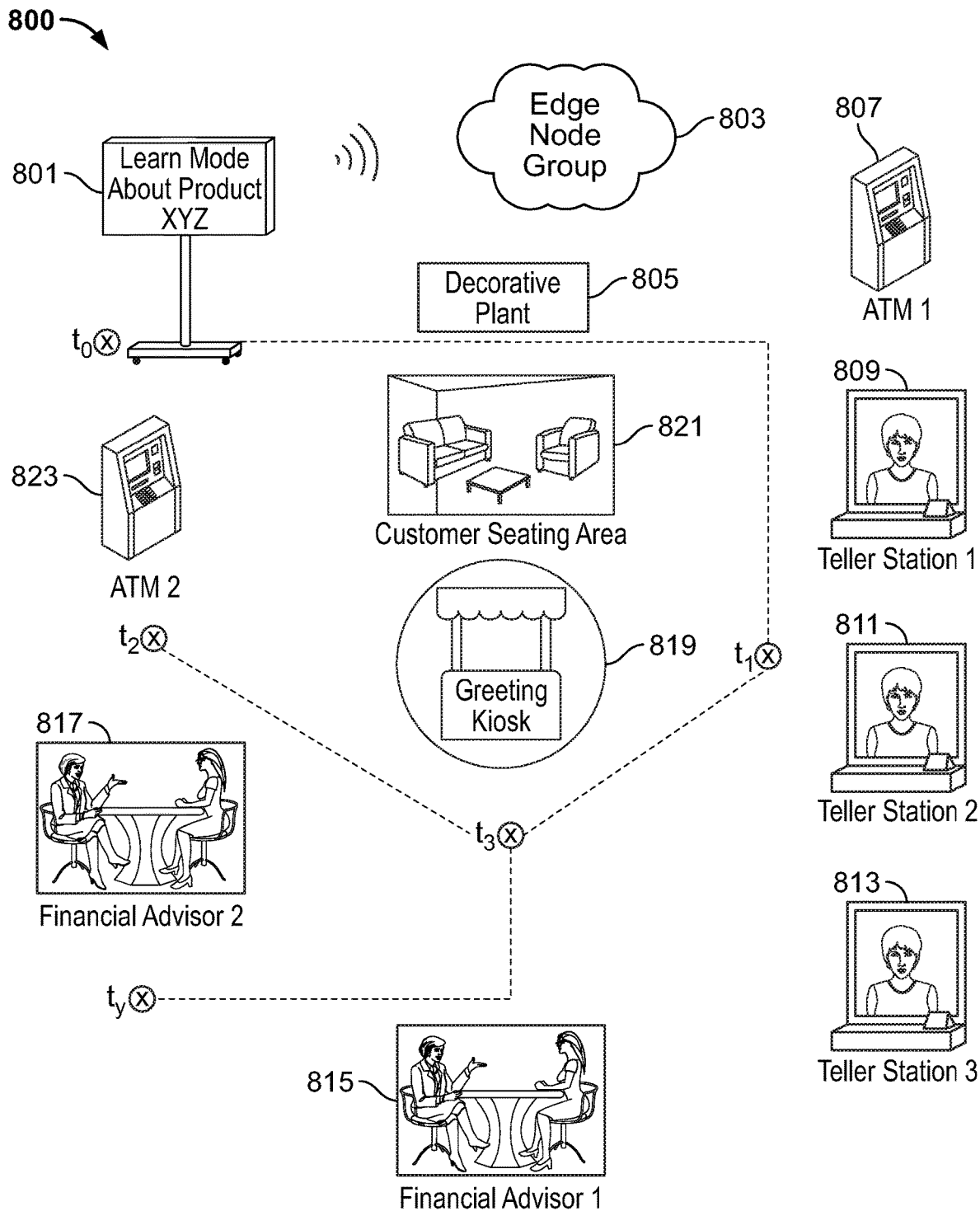
FIG. 8 shows illustrative apparatus and process for re-distributing resources in accordance with principles of the disclosure.

FIG. 8 shows illustrative apparatus 800 for re-distributing resources in a banking center. Apparatus 800 shows moveable product display 801 at time to. Moveable product display 801 is configured to move across a floor of the banking center. Moveable product display 801 may include a multi-axis mechanical system designed to operate according to CNC protocols. Moveable product display 801 may include wheels, axles, and motors to drive axles. Moveable product display 801 may include actuators configured to move a product presentation in any suitable fashion. Illustrative movements include pan, tilt, truck, dolly, follow, pedestal or otherwise orient itself in any suitable position.

Edge-node group 803 may monitor customer traffic in the banking center and determine a target location for moveable product display 801 at time $t_1$. Edge-node group 803 may include sensors and edge-nodes within the banking center. Edge-node group 803 may include sensors and edge-nodes outside the banking center.

Edge-node group 803 may formulate and issue instructions to move moveable product display 801. Moveable product display 801 may include one or more sensors/actuators that move moveable product display 801 and avoid obstacles within the banking center. Illustrative obstacles include decorative plant 805, customer seating area 821, ATM 807 and teller stations 809, 811 and 813. In some embodiments, moveable product display may be specifically positioned relative to decorative plant 805, customer seating area 821, ATM 807 and teller stations 809, 811 and 813.

Edge-node network 803 may monitor customer traffic in the banking center and determine a target location for moveable product display 801 at time $t_2$. Edge-node network 803 may formulate and issue instructions to move moveable product display 801. To relocate to the $t_2$ position, moveable product display 801 may need to avoid obstacles such as greeting kiosk 819, financial advisor station 815, financial advisor station 817 and ATM 823. In some embodiments, moveable product display may be specifically positioned relative to greeting kiosk 819, financial advisor station 815, financial advisor station 817 and ATM 823.

Edge-node network 803 may monitor customer traffic in the banking center and determine a target location for moveable product display 801 at time $t_3$ or at any suitable time such as $t_y$. Moveable product display 801 may include one or more sensors that move the display and avoid obstacles within the banking center. Illustrative sensors that may be included in a moveable product display include motion sensors, temperature sensors, pressure sensors, a gyroscope, an accelerometer sensor and location sensor.

Figure 9:
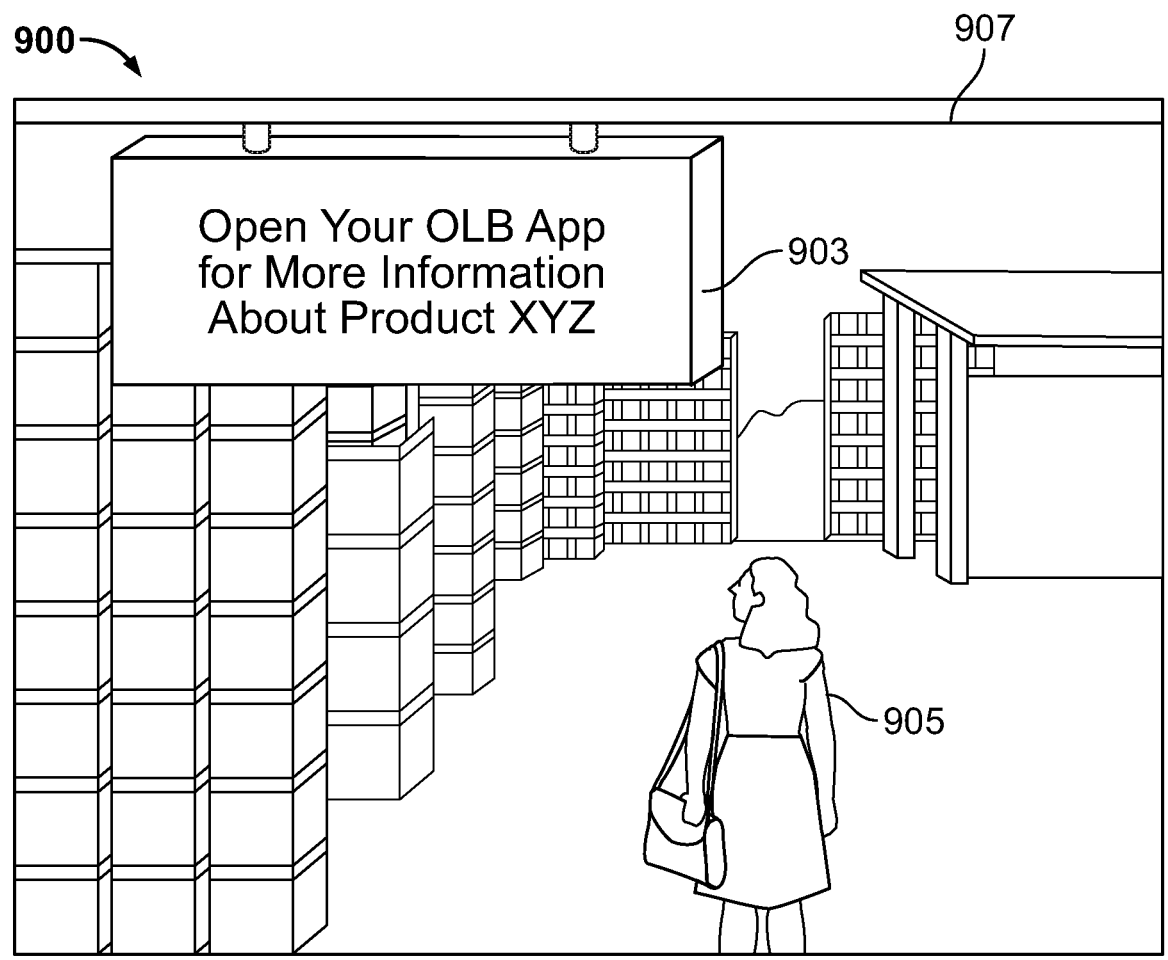
FIG. 9 shows illustrative apparatus for re-distributing resources in accordance with principles of the disclosure.

FIG. 9 shows illustrative apparatus 900. Apparatus 900 includes moveable product display 903. Moveable product display 903 is moveable along ceiling mounted tracks 907 in a banking center. In some embodiments, a moveable product display may be configured to move on wall mounted tracks.

An edge-node may position moveable product display 903 in a target position. The edge-node may determine a target position expected to attract a threshold level of customer engagement with product display 903.

Figure 10:
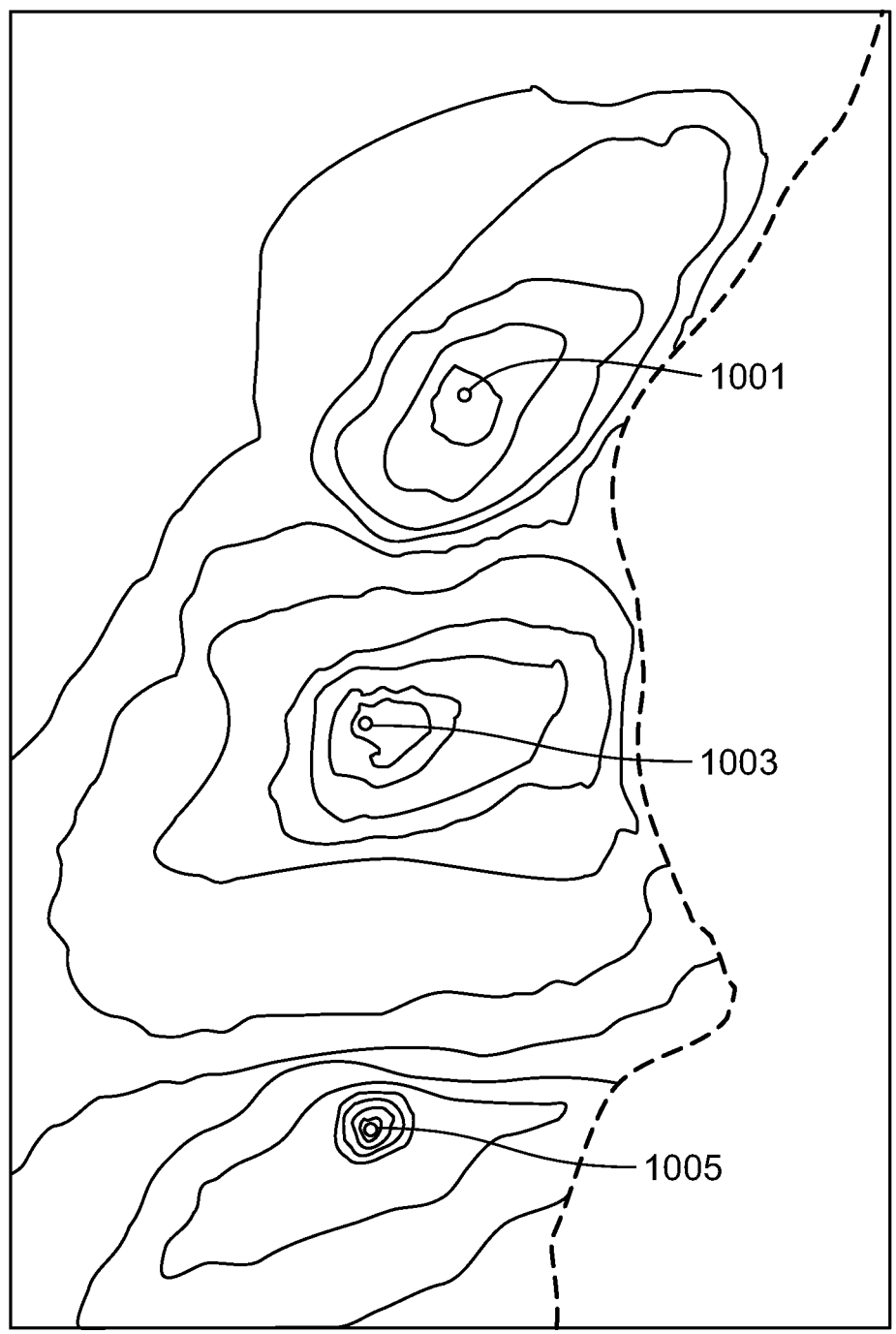
FIG. 10 shows illustrative resource demand in accordance with principles of the disclosure.

FIG. 10 shows illustrative customer traffic flow 1000 near banking centers 1001, 1003 and 1005. Customer traffic flow 1000 may provide an estimated demand for resources needed to provide a threshold quality of service at banking centers 1001, 1003 and 1005.

Customer traffic flow 1000 shows a relatively high volume of customer traffic near banking center 1005. The relatively high volume of customer traffic may increase demand for resources at banking center 1005. Based on detected customer traffic flow 1000, an edge-node may redirect additional resources to banking center 1005. Based on detected customer traffic flow 1000, an edge-node may redirect customers near banking center 1005 to banking center 1003. Based on detected customer traffic flow 1000, an edge-node may redirect resources from banking center 1001 to banking center 1005. An edge-node may redirect resources by issuing instructions to a cloud computing environment, customer mobile device or moveable product display.

Thus, apparatus and methods for EDGE-NODE CONTROLLED RESOURCE DISTRIBUTION are provided. Persons skilled in the art will appreciate that the present disclosure can be practiced by other than the described embodiments, which are presented for purposes of illustration rather than of limitation. The present disclosure is limited only by the claims that follow.

What is claimed is:

1. An edge-node computing system comprising:
    a moveable product display located at a first position within a banking center;
    a first edge-node configured to sense a volume of human customer traffic in the banking center;
    a second edge-node configured to sense a volume of human customer traffic attracted by the moveable product display; and
    a third edge-node embedded in the moveable product display and configured to sense customer engagement with the product display;
    wherein:
        the first, second and third edge-nodes collectively execute a consensus protocol that:
            based on the collective data sensed by each the edge-nodes, determines a default level of interest in the moveable product display at the first position;
            calculates a second position of the product display within the banking center that will increase the default level of interest; and
            issues instructions to the moveable product display that moves the moveable product display from the first position to the second position.

2. The edge-node computing system of claim 1, wherein each edge-node is configured to transmit sensed data to a cloud computing environment and, based on the collective sensed data, the cloud computing environment is configured to determine a target location within the banking center that will increase the default level of interest.

3. The edge-node computing system of claim 2 wherein, when there is a conflict between the target location determined by the cloud computing environment and the second position determined by the consensus protocol, the edge-node computing system moves the moveable product display to the target location.

4. The edge-node computing system of claim 2, wherein the banking center is one of a plurality of banking centers, and the cloud computing environment is configured to determine the target location based on sensed data received from edge-nodes within the plurality of banking centers.

5. The edge-node computing system of claim 1, wherein the moveable product display is configured to change products included in the moveable display based on the collective data sensed by the edge-nodes.

6. The edge-node computing system of claim 1, wherein the second location of the moveable product display is configured to change based on a time of day.

7. The edge-node computing system of claim 1, wherein the second location of the moveable product display is configured to change based on transactions executed by customers in the banking center during a predetermined time period.

8. A method of distributing computing resources among a plurality of banking centers, the method comprising:
    positioning a moveable product display at a banking center in a first location;
    using a first group of edge-nodes, determining a volume of human customer traffic in the banking center;
    using a second group of edge-nodes, determining a volume of human customer traffic within a predetermined distance of the banking center; and
    executing a consensus protocol among members of the first and second groups of edge-nodes and:
        determining a level of interest in the moveable product display;
        determining a level of computing resources needed to provide a predetermined quality of service for the level of interest;
        based on the level of interest, determining a target location of the moveable product display within the banking center;
        moving the moveable product display to the target location; and
        routing computing resources to the banking center such that the banking center is provided access to the level of computing resources needed to provide the predetermined quality of service.

9. The method of claim 8 wherein the banking center is a first banking center, the routing of computing resources comprises configuring a cloud computing environment to divert computing resources from a second banking center to the first banking center.

10. The method of claim 8 further comprising:
    using a third group of edge-nodes embedded in the moveable product display, sensing customer engagement with the moveable product display; and
    executing the consensus protocol among members of the first, second and third groups of edge-nodes.

11. The method of claim 8, wherein the moveable product display provides access to a mix of products, the method further comprising, based on the level of interest, changing the mix of products.

12. The method of claim 8, routing computing resources to the banking center comprises increasing:
    bandwidth of network connections linking the banking center to the cloud computing environment; and processor time allocated by the cloud computing environment to the banking center.

13. The method of claim 8 further comprising routing human resources to the banking center such that the banking center is configured to provide the predetermined quality of service;
   wherein the routing of human resources comprises automated scheduling of the human resources.

\* \* \* \* \*